US009258845B2

(12) United States Patent
DePani et al.

(10) Patent No.: US 9,258,845 B2
(45) Date of Patent: *Feb. 9, 2016

(54) CELLULAR DOCKING STATION

(71) Applicant: AT&T Intellectual Property I, L.P., Atlanta, GA (US)

(72) Inventors: Sebastiano DePani, Atlanta, GA (US); Peter O. Roach, Jr., Jacksonville, FL (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 92 days.

This patent is subject to a terminal disclaimer.

(21) Appl. No.: 14/076,801

(22) Filed: Nov. 11, 2013

(65) Prior Publication Data
US 2014/0066032 A1 Mar. 6, 2014

Related U.S. Application Data

(63) Continuation of application No. 11/952,510, filed on Dec. 7, 2007, now Pat. No. 8,583,106, which is a continuation of application No. 11/322,532, filed on Dec. 30, 2005, now Pat. No. 7,363,034, which is a
(Continued)

(51) Int. Cl.
*H04W 4/00* (2009.01)
*H04W 88/04* (2009.01)
(Continued)

(52) U.S. Cl.
CPC ............. *H04W 88/04* (2013.01); *H04L 12/66* (2013.01); *H04M 1/66* (2013.01); *H04M 1/725* (2013.01);
(Continued)

(58) Field of Classification Search
CPC ...... H04L 12/66; H04M 1/725; H04M 1/723; H04W 84/14; H04W 88/04
USPC ............. 455/445, 426.2, 465, 74.1, 555, 557
See application file for complete search history.

(56) References Cited

U.S. PATENT DOCUMENTS 3,729,594 A 4/1973 Krock et al.
3,906,166 A 9/1975 Cooper et al.
(Continued)

FOREIGN PATENT DOCUMENTS

EP 0342707 11/1989
EP 0617528 9/1994
(Continued)

OTHER PUBLICATIONS

U.S. Pat. No. 6,876,861, Apr. 2005, Frank et al. (withdrawn).
(Continued)

*Primary Examiner* — Barry Taylor
(74) *Attorney, Agent, or Firm* — Hartman & Citrin LLC

(57) ABSTRACT

A system for communicating with the user of a cellular telephone via the cellular mobile radio (CMR) system and the public switched telephone network (PSTN). A communications interface appends the telephone exchange number of an outgoing communication to include an identifier unique to the communications interface. The outgoing communication is transmitted by the cellular telephone to the CMR system, which recognizes and verifies the outgoing communication as originating with the communications interface. Accordingly, the origination of the outgoing communication from a communications interface is documented prior to forwarding the outgoing communication to its intended recipient via the PSTN. Communications incoming to a communications interface are authenticated as such, and a record as to this is created, prior to forwarding the incoming communication to the cellular telephone.

16 Claims, 5 Drawing Sheets

Related U.S. Application Data continuation of application No. 09/999,806, filed on Oct. 24, 2001, now Pat. No. 7,149,514, which is a continuation of application No. 09/126,268, filed on Jul. 30, 1998, now Pat. No. 6,480,714.

(60) Provisional application No. 60/054,238, filed on Jul. 30, 1997.

(51) Int. Cl.

| | |
|---|---|
| *H04L 12/66* | (2006.01) |
| *H04M 1/66* | (2006.01) |
| *H04M 1/725* | (2006.01) |
| *H04W 84/14* | (2009.01) |
| *H04W 88/02* | (2009.01) |
| *H04M 1/723* | (2006.01) |
| *H04W 8/26* | (2009.01) |
| *H04W 12/06* | (2009.01) |
| *H04W 84/04* | (2009.01) |
| *H04W 92/02* | (2009.01) |

(52) U.S. Cl.
CPC ............. *H04W 84/14* (2013.01); *H04W 88/02* (2013.01); *H04W 88/021* (2013.01); *H04M 1/723* (2013.01); *H04W 8/26* (2013.01); *H04W 12/06* (2013.01); *H04W 84/042* (2013.01); *H04W 92/02* (2013.01)

(56) References Cited

U.S. PATENT DOCUMENTS

| | | | |
|---|---|---|---|
| 3,956,596 | A | 5/1976 | Connolly et al. |
| 4,218,590 | A | 8/1980 | Rasmussen et al. |
| 4,268,722 | A | 5/1981 | Little et al. |
| 4,390,963 | A | 6/1983 | Puhl et al. |
| 4,398,265 | A | 8/1983 | Puhl et al. |
| 4,421,952 | A | 12/1983 | Barnes |
| 4,434,461 | A | 2/1984 | Puhl |
| 4,485,486 | A | 11/1984 | Webb et al. |
| 4,486,624 | A | 12/1984 | Puhl et al. |
| 4,528,424 | A | 7/1985 | Middleton et al. |
| 4,549,311 | A | 10/1985 | Mclaughlin |
| 4,575,582 | A | 3/1986 | Makino |
| 4,654,655 | A | 3/1987 | Kowalski |
| 4,658,096 | A | 4/1987 | West, Jr. et al. |
| 4,691,338 | A | 9/1987 | Makino |
| 4,706,274 | A | 11/1987 | Baker et al. |
| 4,734,928 | A | 3/1988 | Weiner et al. |
| 4,737,975 | A | 4/1988 | Shafer |
| 4,737,978 | A | 4/1988 | Burke et al. |
| 4,741,018 | A | 4/1988 | Potratz et al. |
| 4,748,655 | A | 5/1988 | Thrower et al. |
| 4,751,725 | A | 6/1988 | Bonta et al. |
| 4,755,998 | A | 7/1988 | Gallager |
| 4,775,997 | A | 10/1988 | West, Jr. et al. |
| 4,775,998 | A | 10/1988 | Felix et al. |
| 4,775,999 | A | 10/1988 | Williams |
| 4,799,253 | A | 1/1989 | Stern et al. |
| 4,843,621 | A | 6/1989 | Potratz |
| 4,853,951 | A | 8/1989 | Bauer |
| 4,866,762 | A | 9/1989 | Pintar |
| 4,868,519 | A | 9/1989 | Shafer |
| 4,890,315 | A * | 12/1989 | Bendixen et al. .......... 455/554.2 |
| 4,893,327 | A | 1/1990 | Stern et al. |
| 4,922,486 | A | 5/1990 | Lidinsky et al. |
| 4,922,517 | A | 5/1990 | West, Jr. et al. |
| 5,020,091 | A | 5/1991 | Krolopp et al. |
| 5,020,094 | A | 5/1991 | Rash et al. |
| 5,046,085 | A | 9/1991 | Godsey et al. |
| 5,117,450 | A | 5/1992 | Joglekar et al. |
| 5,134,651 | A | 7/1992 | Ortiz et al. |
| 5,185,779 | A | 2/1993 | Dop et al. |
| 5,222,123 | A | 6/1993 | Brown et al. |
| D339,809 | S | 9/1993 | Ron |
| 5,257,406 | A | 10/1993 | Ito et al. |
| 5,261,121 | A | 11/1993 | Hashimoto |
| 5,287,322 | A | 2/1994 | Rastegar |
| 5,311,477 | A | 5/1994 | Rastegar |
| 5,323,418 | A | 6/1994 | Ayerst et al. |
| 5,329,578 | A | 7/1994 | Brennan et al. |
| 5,361,297 | A | 11/1994 | Ortiz et al. |
| 5,367,558 | A | 11/1994 | Gillig et al. |
| 5,375,258 | A | 12/1994 | Gillig |
| D354,749 | S | 1/1995 | Phillips |
| 5,406,588 | A | 4/1995 | Birchler et al. |
| 5,426,689 | A | 6/1995 | Griffith et al. |
| 5,430,719 | A | 7/1995 | Weisser, Jr. |
| 5,430,761 | A | 7/1995 | Bruckert et al. |
| 5,442,680 | A | 8/1995 | Schellinger et al. |
| 5,444,433 | A | 8/1995 | Gropper |
| 5,444,765 | A | 8/1995 | Marui et al. |
| D362,003 | S | 9/1995 | Claudio |
| 5,469,465 | A | 11/1995 | Birchler et al. |
| 5,469,494 | A | 11/1995 | Ortiz Perez et al. |
| 5,471,670 | A | 11/1995 | Hess et al. |
| 5,475,734 | A | 12/1995 | McDonald et al. |
| 5,475,735 | A | 12/1995 | Williams et al. |
| 5,479,480 | A | 12/1995 | Scott |
| 5,497,412 | A | 3/1996 | Lannen et al. |
| 5,506,887 | A | 4/1996 | Emery |
| 5,524,061 | A | 6/1996 | Mooney et al. |
| 5,524,137 | A | 6/1996 | Rhee |
| 5,528,666 | A | 6/1996 | Weigand et al. |
| 5,530,736 | A | 6/1996 | Comer et al. |
| 5,533,099 | A | 7/1996 | Byrne |
| 5,544,227 | A | 8/1996 | Blust et al. |
| 5,546,444 | A | 8/1996 | Roach, Jr. et al. |
| 5,548,814 | A | 8/1996 | Lorang et al. |
| 5,564,072 | A | 10/1996 | Garcia Aguilera et al. |
| 5,574,984 | A | 11/1996 | Reed et al. |
| 5,588,041 | A | 12/1996 | Meyer, Jr. et al. |
| 5,594,782 | A | 1/1997 | Zicker et al. |
| 5,596,625 | A | 1/1997 | LeBlanc |
| 5,598,412 | A | 1/1997 | Griffith et al. |
| 5,608,655 | A | 3/1997 | Moughanni et al. |
| 5,610,910 | A | 3/1997 | Focsaneanu et al. |
| 5,611,049 | A | 3/1997 | Pitts |
| 5,613,213 | A | 3/1997 | Naddell et al. |
| 5,629,976 | A | 5/1997 | Loke et al. |
| 5,631,946 | A | 5/1997 | Campana et al. |
| 5,659,698 | A | 8/1997 | Weng et al. |
| 5,666,487 | A | 9/1997 | Goodman et al. |
| 5,668,561 | A | 9/1997 | Perrotta et al. |
| 5,673,304 | A | 9/1997 | Connor et al. |
| 5,675,629 | A | 10/1997 | Raffel et al. |
| 5,689,549 | A | 11/1997 | Bertocci et al. |
| 5,689,803 | A | 11/1997 | Tayloe |
| 5,703,933 | A | 12/1997 | Ghisler |
| 5,706,328 | A | 1/1998 | Williman |
| 5,708,659 | A | 1/1998 | Rostoker et al. |
| 5,715,293 | A | 2/1998 | Mahoney |
| 5,715,296 | A | 2/1998 | Schornack et al. |
| 5,721,732 | A | 2/1998 | Emeott et al. |
| 5,724,656 | A | 3/1998 | Vo et al. |
| 5,742,905 | A | 4/1998 | Pepe et al. |
| 5,751,789 | A | 5/1998 | Farris et al. |
| 5,757,902 | A | 5/1998 | Mitsuo |
| 5,758,281 | A | 5/1998 | Emery et al. |
| 5,764,730 | A | 6/1998 | Rabe et al. |
| 5,771,453 | A | 6/1998 | Haartsen |
| 5,771,459 | A | 6/1998 | Demery et al. |
| 5,774,793 | A | 6/1998 | Cooper et al. |
| 5,774,805 | A | 6/1998 | Zicker |
| 5,774,857 | A | 6/1998 | Newlin |
| 5,790,631 | A | 8/1998 | Minarczik et al. |
| 5,798,694 | A | 8/1998 | Reber et al. |
| 5,801,654 | A | 9/1998 | Traylor |
| 5,802,481 | A | 9/1998 | Prieto |
| 5,812,637 | A | 9/1998 | Schornack et al. |
| 5,818,824 | A | 10/1998 | Lu et al. |
| 5,826,034 | A | 10/1998 | Albal |
| 5,826,193 | A | 10/1998 | Ghisler et al. |

(56) References Cited

U.S. PATENT DOCUMENTS

| | | | |
|---|---|---|---|
| 5,849,433 A | 12/1998 | Venugopal et al. |
| 5,859,894 A | 1/1999 | Ortiz Perez et al. |
| 5,875,395 A | 2/1999 | Holmes |
| 5,877,821 A | 3/1999 | Newlin et al. |
| 5,878,096 A | 3/1999 | Shao et al. |
| 5,884,193 A | 3/1999 | Kaplan |
| 5,898,679 A | 4/1999 | Brederveld et al. |
| 5,901,359 A | 5/1999 | Malmstrom |
| 5,903,832 A | 5/1999 | Seppanen et al. |
| 5,903,833 A | 5/1999 | Jonsson et al. |
| 5,905,950 A | 5/1999 | Anell |
| 5,911,120 A | 6/1999 | Jarett et al. |
| 5,917,434 A | 6/1999 | Murphy |
| 5,920,596 A | 7/1999 | Pan et al. |
| 5,920,815 A | 7/1999 | Akhavan |
| 5,926,760 A | 7/1999 | Khan et al. |
| 5,937,058 A | 8/1999 | Bleile et al. |
| 5,946,384 A | 8/1999 | Yee et al. |
| 5,946,616 A | 8/1999 | Schornack et al. |
| 5,949,616 A | 9/1999 | Coon et al. |
| 5,966,428 A | 10/1999 | Ortiz Perez et al. |
| 5,970,388 A | 10/1999 | Will |
| 5,978,469 A | 11/1999 | Benson |
| 5,982,762 A | 11/1999 | Anzai et al. |
| 5,982,854 A | 11/1999 | Ehreth |
| 5,983,117 A | 11/1999 | Sandler et al. |
| 5,987,100 A | 11/1999 | Fortman et al. |
| 5,987,678 A | 11/1999 | Ayers |
| 5,995,839 A | 11/1999 | Coursey et al. |
| 6,002,937 A * | 12/1999 | Young et al. ............ 455/462 |
| 6,009,086 A | 12/1999 | Freeburg et al. |
| 6,014,569 A | 1/2000 | Bottum |
| 6,016,107 A | 1/2000 | Kampe et al. |
| 6,016,269 A | 1/2000 | Peterson et al. |
| 6,018,665 A | 1/2000 | Chavez, Jr. et al. |
| 6,026,086 A | 2/2000 | Lancelot et al. |
| 6,028,984 A | 2/2000 | Kimball |
| 6,029,072 A | 2/2000 | Barber |
| 6,031,492 A | 2/2000 | Griffin et al. |
| 6,035,215 A | 3/2000 | Goni et al. |
| 6,035,220 A | 3/2000 | Claudio et al. |
| 6,038,265 A | 3/2000 | Pan et al. |
| 6,044,148 A | 3/2000 | Bleile |
| 6,058,106 A | 5/2000 | Cudak et al. |
| 6,061,439 A | 5/2000 | Bleile et al. |
| 6,072,828 A | 6/2000 | Chun |
| 6,072,858 A | 6/2000 | Bellin |
| 6,072,862 A | 6/2000 | Srinivasan |
| 6,072,869 A | 6/2000 | Becker et al. |
| 6,073,031 A | 6/2000 | Helstab et al. |
| 6,075,783 A | 6/2000 | Voit |
| 6,078,805 A | 6/2000 | Scott |
| 6,080,690 A | 6/2000 | Lebby et al. |
| 6,114,053 A | 9/2000 | Matsuyama et al. |
| 6,115,388 A | 9/2000 | Chinitz et al. |
| 6,115,604 A | 9/2000 | Lester et al. |
| 6,116,014 A | 9/2000 | Dalla Betta et al. |
| 6,121,881 A | 9/2000 | Bieback et al. |
| 6,122,515 A | 9/2000 | Ito et al. |
| 6,122,531 A | 9/2000 | Nicholls et al. |
| 6,125,126 A | 9/2000 | Hallenstang |
| 6,134,235 A | 10/2000 | Goldman et al. |
| 6,134,314 A | 10/2000 | Dougherty et al. |
| 6,137,466 A | 10/2000 | Moughanni et al. |
| 6,138,026 A | 10/2000 | Irvin |
| 6,141,341 A | 10/2000 | Jones et al. |
| 6,145,084 A | 11/2000 | Zuili et al. |
| 6,148,069 A | 11/2000 | Ekstrom et al. |
| 6,151,500 A | 11/2000 | Cardina et al. |
| 6,151,620 A | 11/2000 | Madsen et al. |
| 6,157,545 A | 12/2000 | Janninck et al. |
| 6,167,271 A | 12/2000 | Parker et al. |
| 6,167,278 A | 12/2000 | Nilssen |
| 6,169,988 B1 | 1/2001 | Asakura |
| 6,188,888 B1 | 2/2001 | Bartle et al. |
| 6,192,231 B1 | 2/2001 | Chapman et al. |
| 6,198,947 B1 | 3/2001 | Barber |
| 6,203,192 B1 | 3/2001 | Fortman |
| 6,208,627 B1 | 3/2001 | Menon et al. |
| 6,212,396 B1 | 4/2001 | Brown et al. |
| 6,212,550 B1 | 4/2001 | Segur |
| 6,222,919 B1 | 4/2001 | Hollatz et al. |
| 6,230,031 B1 | 5/2001 | Barber |
| 6,240,277 B1 | 5/2001 | Bright |
| 6,252,867 B1 | 6/2001 | Pfeil et al. |
| 6,253,088 B1 | 6/2001 | Wenk et al. |
| 6,256,489 B1 | 7/2001 | Lichter et al. |
| 6,259,925 B1 | 7/2001 | Josse |
| 6,272,134 B1 | 8/2001 | Bass et al. |
| 6,282,564 B1 | 8/2001 | Smith et al. |
| 6,295,348 B1 | 9/2001 | Bleile et al. |
| 6,297,646 B1 | 10/2001 | Lang et al. |
| 6,301,474 B1 | 10/2001 | Hartmaier et al. |
| 6,314,299 B1 | 11/2001 | Schreib et al. |
| 6,317,064 B1 | 11/2001 | Ferrer et al. |
| 6,324,410 B1 | 11/2001 | Giacopelli et al. |
| 6,330,247 B1 | 12/2001 | Chang et al. |
| 6,331,972 B1 | 12/2001 | Harris et al. |
| 6,333,919 B2 | 12/2001 | Gaffney |
| 6,339,795 B1 | 1/2002 | Narurkar et al. |
| 6,362,778 B2 | 3/2002 | Neher |
| 6,396,413 B2 | 5/2002 | Hines et al. |
| 6,396,457 B1 | 5/2002 | Gatherer et al. |
| 6,405,027 B1 | 6/2002 | Bell |
| 6,411,802 B1 | 6/2002 | Cardina et al. |
| 6,429,811 B1 | 8/2002 | Zhao et al. |
| 6,434,394 B1 | 8/2002 | Grundvig et al. |
| 6,438,215 B1 | 8/2002 | Skladman et al. |
| 6,442,241 B1 | 8/2002 | Tsumpes |
| 6,449,269 B1 | 9/2002 | Edholm |
| 6,453,154 B1 | 9/2002 | Haber et al. |
| 6,459,688 B1 | 10/2002 | Bursztejn et al. |
| 6,459,776 B1 | 10/2002 | Aktas et al. |
| 6,466,783 B2 | 10/2002 | Dahm et al. |
| 6,466,799 B1 | 10/2002 | Torrey et al. |
| 6,470,028 B1 | 10/2002 | Perry et al. |
| 6,470,187 B1 | 10/2002 | Rosen et al. |
| 6,477,362 B1 | 11/2002 | Raith et al. |
| 6,480,714 B1 * | 11/2002 | DePani et al. ............ 455/422.1 |
| 6,496,693 B1 | 12/2002 | Tran |
| 6,498,938 B1 | 12/2002 | Morrow, Sr. |
| 6,507,589 B1 | 1/2003 | Ramasubramani et al. |
| 6,515,967 B1 | 2/2003 | Wei et al. |
| 6,526,581 B1 | 2/2003 | Edson |
| 6,529,707 B1 | 3/2003 | Dent |
| 6,529,746 B1 | 3/2003 | Kotzin |
| 6,542,497 B1 | 4/2003 | Curry et al. |
| 6,573,938 B1 | 6/2003 | Schulz et al. |
| 6,577,952 B2 | 6/2003 | Geier et al. |
| 6,600,734 B1 | 7/2003 | Gernert et al. |
| 6,615,056 B1 | 9/2003 | Taylor et al. |
| 6,631,120 B1 | 10/2003 | Milbrandt |
| 6,639,917 B1 | 10/2003 | Ellington et al. |
| 6,643,709 B1 | 11/2003 | Kwon |
| 6,690,923 B1 | 2/2004 | Ortiz Perez et al. |
| 6,701,352 B1 | 3/2004 | Gardner et al. |
| 6,704,317 B1 | 3/2004 | Dobson |
| 6,704,580 B1 | 3/2004 | Fintel |
| 6,707,888 B1 | 3/2004 | Cope |
| 6,714,797 B1 | 3/2004 | Rautila |
| D490,063 S | 5/2004 | Miller |
| D490,066 S | 5/2004 | Lytel |
| D490,067 S | 5/2004 | Haney |
| 6,741,835 B2 | 5/2004 | Pulver |
| D490,794 S | 6/2004 | Rathmell |
| D491,159 S | 6/2004 | Lytel |
| 6,757,528 B1 | 6/2004 | Cardina et al. |
| 6,775,522 B2 | 8/2004 | Schornack et al. |
| 6,775,552 B2 | 8/2004 | Link, II |
| 6,778,824 B2 | 8/2004 | Wonak et al. |
| 6,781,481 B2 | 8/2004 | Richardson |
| 6,782,003 B1 | 8/2004 | Giroux et al. |
| 6,785,517 B2 | 8/2004 | Schornack et al. |
| 6,788,953 B1 | 9/2004 | Cheah et al. |

(56) References Cited

U.S. PATENT DOCUMENTS

| | | |
|---|---|---|
| 6,792,095 B1 | 9/2004 | Frank |
| 6,801,159 B2 | 10/2004 | Swope et al. |
| 6,801,793 B1 | 10/2004 | Aarnio et al. |
| 6,801,934 B1 | 10/2004 | Eranko et al. |
| 6,825,762 B2 | 11/2004 | Giacopelli et al. |
| 6,829,501 B2 | 12/2004 | Nielsen et al. |
| 6,832,082 B1 | 12/2004 | Ramaswamy et al. |
| 6,832,093 B1 | 12/2004 | Ranta |
| 6,865,384 B2 | 3/2005 | Sagi et al. |
| 6,900,772 B2 | 5/2005 | Pulver |
| 6,920,144 B2 | 7/2005 | Niermann |
| 6,920,313 B2 | 7/2005 | Trombatore |
| 6,922,170 B2 | 7/2005 | Alexander, Jr. |
| 6,922,432 B2 | 7/2005 | Callaway, Jr. et al. |
| 6,940,820 B2 | 9/2005 | Fang |
| 6,947,738 B2 | 9/2005 | Skog et al. |
| 6,950,674 B2 | 9/2005 | Jarrett |
| 6,961,330 B1 | 11/2005 | Catten et al. |
| 6,961,575 B2 | 11/2005 | Stanforth |
| 6,965,313 B1 | 11/2005 | Saylor et al. |
| 6,978,141 B2 | 12/2005 | Smith et al. |
| 6,978,154 B1 | 12/2005 | Ospalak et al. |
| 6,981,045 B1 | 12/2005 | Brooks |
| 6,996,396 B1 | 2/2006 | Snapp |
| 7,003,287 B2 | 2/2006 | Roeder |
| 7,032,115 B2 | 4/2006 | Kashani |
| 7,035,633 B2 | 4/2006 | Kirkpatrick |
| 7,073,129 B1 | 7/2006 | Robarts et al. |
| 7,079,851 B2 | 7/2006 | Makuta |
| 7,085,566 B1 | 8/2006 | Burchard |
| 7,096,491 B2 | 8/2006 | Cheng |
| 7,099,825 B1 | 8/2006 | Cook |
| 7,120,426 B2 | 10/2006 | Link, II et al. |
| 7,120,454 B1 | 10/2006 | Frank |
| 7,130,609 B2 | 10/2006 | Cardina |
| 7,130,616 B2 | 10/2006 | Janik |
| 7,133,795 B1 | 11/2006 | Iaciofano et al. |
| 7,136,358 B2 | 11/2006 | Kunito et al. |
| 7,184,768 B2 | 2/2007 | Hind et al. |
| 7,194,083 B1 | 3/2007 | Tischer et al. |
| 7,195,197 B2 | 3/2007 | Hsu et al. |
| 7,196,625 B1 | 3/2007 | Nguyen |
| 7,200,424 B2 | 4/2007 | Tischer et al. |
| 7,203,199 B1 | 4/2007 | Duree et al. |
| 7,212,111 B2 | 5/2007 | Tupler et |
| 7,218,895 B1 | 5/2007 | Raghavan |
| 7,221,950 B2 | 5/2007 | Frank et al. |
| 7,231,481 B2 | 6/2007 | Scott et al. |
| 7,248,590 B1 | 7/2007 | Liu |
| 7,272,153 B2 | 9/2007 | Cline |
| 7,274,926 B1 | 9/2007 | Laumen et al. |
| 7,274,927 B2 | 9/2007 | Olrik |
| 7,280,817 B2 | 10/2007 | Comp |
| 7,283,519 B2 | 10/2007 | Girard |
| 7,284,147 B2 | 10/2007 | Rao et al. |
| 7,289,616 B2 | 10/2007 | Punaganti Venkata et al. |
| 7,308,498 B1 | 12/2007 | Olsen et al. |
| 7,315,553 B2 | 1/2008 | Keller-Tuberg et al. |
| 7,318,099 B2 | 1/2008 | Stahl et al. |
| 7,376,386 B2 | 5/2008 | Phillips et al. |
| 7,392,035 B2 | 6/2008 | Rahman et al. |
| 7,418,492 B1 | 8/2008 | Cohen et al. |
| 7,437,148 B1 | 10/2008 | Vaghi et al. |
| 7,437,330 B1 | 10/2008 | Robinson et al. |
| 7,440,887 B2 | 10/2008 | Soulet |
| 7,460,510 B2 | 12/2008 | Olivier et al. |
| 7,467,103 B1 | 12/2008 | Murray et al. |
| 7,499,529 B1 | 3/2009 | Kvache et al. |
| 7,522,722 B2 | 4/2009 | Tischer et al. |
| 7,574,523 B2 | 8/2009 | Traversat et al. |
| 7,623,653 B2 | 11/2009 | Tischer et al. |
| 7,630,705 B2 | 12/2009 | Galicia et al. |
| 7,650,415 B1 | 1/2010 | Peterson |
| 8,583,106 B2 * | 11/2013 | Depani et al. ............... 455/426.2 |
| 2001/0026537 A1 | 10/2001 | Massey |
| 2001/0035459 A1 | 11/2001 | Komai |
| 2001/0037404 A1 | 11/2001 | Hafsteinsson et al. |
| 2001/0040512 A1 | 11/2001 | Hines |
| 2001/0041533 A1 | 11/2001 | Schornack et al. |
| 2001/0049264 A1 | 12/2001 | Balech |
| 2002/0006137 A1 | 1/2002 | Rabenko et al. |
| 2002/0016739 A1 | 2/2002 | Ogasawara |
| 2002/0021669 A1 | 2/2002 | Kunito et al. |
| 2002/0023010 A1 | 2/2002 | Rittmaster et al. |
| 2002/0025832 A1 | 2/2002 | Durian et al. |
| 2002/0027994 A1 | 3/2002 | Katayama et al. |
| 2002/0039892 A1 | 4/2002 | Lindell |
| 2002/0044641 A1 | 4/2002 | Wanner |
| 2002/0045453 A1 | 4/2002 | Juttner et al. |
| 2002/0054667 A1 | 5/2002 | Martinez |
| 2002/0055359 A1 | 5/2002 | Andersson et al. |
| 2002/0065109 A1 | 5/2002 | Mansikkaniemi et al. |
| 2002/0068529 A1 | 6/2002 | Knoble |
| 2002/0068544 A1 | 6/2002 | Barzilay et al. |
| 2002/0068558 A1 | 6/2002 | Janik |
| 2002/0073416 A1 | 6/2002 | Ramsey Catan |
| 2002/0086666 A1 | 7/2002 | Chen |
| 2002/0089998 A1 | 7/2002 | Le |
| 2002/0093948 A1 | 7/2002 | Dertz et al. |
| 2002/0094776 A1 | 7/2002 | Pulver |
| 2002/0098838 A1 | 7/2002 | Ikeda et al. |
| 2002/0098874 A1 | 7/2002 | Zirul et al. |
| 2002/0099663 A1 | 7/2002 | Yoshino et al. |
| 2002/0108121 A1 | 8/2002 | Alao et al. |
| 2002/0123359 A1 | 9/2002 | Wei et al. |
| 2002/0128009 A1 | 9/2002 | Boch et al. |
| 2002/0137498 A1 | 9/2002 | Goss et al. |
| 2002/0146977 A1 | 10/2002 | Schornack et al. |
| 2002/0151327 A1 | 10/2002 | Levitt |
| 2002/0156626 A1 | 10/2002 | Hutchison |
| 2002/0160748 A1 | 10/2002 | Rahman et al. |
| 2002/0184517 A1 | 12/2002 | Tadayon et al. |
| 2003/0005135 A1 | 1/2003 | Inoue et al. |
| 2003/0006913 A1 | 1/2003 | Joyce et al. |
| 2003/0008680 A1 | 1/2003 | Huh et al. |
| 2003/0041000 A1 | 2/2003 | Zajac et al. |
| 2003/0050062 A1 | 3/2003 | Chen et al. |
| 2003/0060231 A1 | 3/2003 | Bozionek et al. |
| 2003/0063714 A1 | 4/2003 | Stumer et al. |
| 2003/0067314 A1 | 4/2003 | Kaukko |
| 2003/0074672 A1 | 4/2003 | Daniels |
| 2003/0076672 A1 | 4/2003 | Head |
| 2003/0078029 A1 | 4/2003 | Petite |
| 2003/0096600 A1 | 5/2003 | Lewis et al. |
| 2003/0108189 A1 | 6/2003 | Barzani |
| 2003/0125023 A1 | 7/2003 | Fishler |
| 2003/0128115 A1 | 7/2003 | Giacopelli et al. |
| 2003/0134661 A1 | 7/2003 | Rudd |
| 2003/0137991 A1 | 7/2003 | Doshi et al. |
| 2003/0138050 A1 | 7/2003 | Yamada et al. |
| 2003/0142798 A1 | 7/2003 | Gavette et al. |
| 2003/0145228 A1 | 7/2003 | Suuronen et al. |
| 2003/0156660 A1 | 8/2003 | Zoltowski et al. |
| 2003/0171095 A1 | 9/2003 | Fujinami |
| 2003/0172121 A1 | 9/2003 | Evans et al. |
| 2003/0172218 A1 | 9/2003 | Scott et al. |
| 2003/0187920 A1 | 10/2003 | Redkar |
| 2003/0190018 A1 | 10/2003 | Bleile et al. |
| 2003/0208651 A1 | 11/2003 | Wurzburg |
| 2003/0214775 A1 | 11/2003 | Fukuta et al. |
| 2003/0216134 A1 | 11/2003 | Mutoh |
| 2003/0231594 A1 | 12/2003 | Xu et al. |
| 2003/0235219 A1 | 12/2003 | Kapadia et al. |
| 2003/0236091 A1 | 12/2003 | Wonak et al. |
| 2004/0024660 A1 | 2/2004 | Ganesh et al. |
| 2004/0045096 A1 | 3/2004 | Mani et al. |
| 2004/0067770 A1 | 4/2004 | King et al. |
| 2004/0095316 A1 | 5/2004 | Shibamiya et al. |
| 2004/0131040 A1 | 7/2004 | Gruhl et al. |
| 2004/0132438 A1 | 7/2004 | White |
| 2004/0160372 A1 | 8/2004 | Pulver |
| 2004/0165681 A1 | 8/2004 | Mohan |
| 2004/0174901 A1 | 9/2004 | Ghori et al. |
| 2004/0177310 A1 | 9/2004 | Mohan et al. |

(56) References Cited

U.S. PATENT DOCUMENTS

| | | |
|---|---|---|
| 2004/0178905 A1 | 9/2004 | Dernier et al. |
| 2004/0203639 A1 | 10/2004 | Ozer et al. |
| 2004/0203705 A1 | 10/2004 | Lundby |
| 2004/0203745 A1 | 10/2004 | Cooper |
| 2004/0203942 A1 | 10/2004 | Dehlin |
| 2004/0205650 A1 | 10/2004 | Cheng |
| 2004/0208119 A1 | 10/2004 | Christodoulou et al. |
| 2004/0214569 A1 | 10/2004 | Cardina et al. |
| 2004/0232770 A1 | 11/2004 | Gisy et al. |
| 2004/0236999 A1 | 11/2004 | Bezuidenhout |
| 2004/0240647 A1 | 12/2004 | Tiliks et al. |
| 2004/0252675 A1 | 12/2004 | Lund |
| 2004/0253945 A1 | 12/2004 | Janik |
| 2004/0266418 A1 | 12/2004 | Kotzin |
| 2004/0267535 A1 | 12/2004 | Kotzin |
| 2005/0002407 A1 | 1/2005 | Shaheen et al. |
| 2005/0021818 A1 | 1/2005 | Singhal et al. |
| 2005/0025299 A1 | 2/2005 | Tischer et al. |
| 2005/0025305 A1 | 2/2005 | Tischer et al. |
| 2005/0025308 A1 | 2/2005 | Tischer et al. |
| 2005/0032435 A1 | 2/2005 | Tischer et al. |
| 2005/0032549 A1 | 2/2005 | Kawaguchi |
| 2005/0037751 A1 | 2/2005 | Kim et al. |
| 2005/0043068 A1 | 2/2005 | Shohara et al. |
| 2005/0044229 A1 | 2/2005 | Brown et al. |
| 2005/0075093 A1 | 4/2005 | Lei et al. |
| 2005/0075131 A1 | 4/2005 | Palan |
| 2005/0099959 A1 | 5/2005 | Standridge |
| 2005/0107109 A1 | 5/2005 | Gunaratnam et al. |
| 2005/0113045 A1 | 5/2005 | Santhoff et al. |
| 2005/0124319 A1 | 6/2005 | Williams et al. |
| 2005/0129224 A1 | 6/2005 | Piket et al. |
| 2005/0129225 A1 | 6/2005 | Piket et al. |
| 2005/0129226 A1 | 6/2005 | Piket et al. |
| 2005/0143016 A1 | 6/2005 | Becker et al. |
| 2005/0143017 A1 | 6/2005 | Lopp et al. |
| 2005/0143149 A1 | 6/2005 | Becker et al. |
| 2005/0143671 A1 | 6/2005 | Hastings et al. |
| 2005/0146431 A1 | 7/2005 | Hastings et al. |
| 2005/0147119 A1 | 7/2005 | Tofano |
| 2005/0148890 A1 | 7/2005 | Hastings |
| 2005/0151640 A1 | 7/2005 | Hastings et al. |
| 2005/0180397 A1 | 8/2005 | Yeom |
| 2005/0191991 A1 | 9/2005 | Owen et al. |
| 2005/0193131 A1 | 9/2005 | Bai et al. |
| 2005/0195855 A1 | 9/2005 | Buskirk et al. |
| 2005/0200492 A1 | 9/2005 | Woodard et al. |
| 2005/0202825 A1 | 9/2005 | Puranik et al. |
| 2005/0232284 A1 | 10/2005 | Karaoguz et al. |
| 2005/0238148 A1 | 10/2005 | Poustchi et al. |
| 2005/0240467 A1 | 10/2005 | Eckart et al. |
| 2005/0245241 A1 | 11/2005 | Durand et al. |
| 2005/0261970 A1 | 11/2005 | Vucina et al. |
| 2005/0271080 A1 | 12/2005 | Gorman |
| 2005/0282536 A1 | 12/2005 | McClure et al. |
| 2006/0059096 A1 | 3/2006 | Dublish et al. |
| 2006/0064750 A1 | 3/2006 | Kersey et al. |
| 2006/0078292 A1 | 4/2006 | Huang et al. |
| 2006/0121916 A1 | 6/2006 | Aborn et al. |
| 2006/0133414 A1 | 6/2006 | Luoma et al. |
| 2006/0143266 A1 | 6/2006 | Ohto et al. |
| 2006/0160571 A1 | 7/2006 | DePani et al. |
| 2006/0167985 A1 | 7/2006 | Albanese et al. |
| 2006/0187956 A1 | 8/2006 | Doviak et al. |
| 2006/0195554 A1 | 8/2006 | Payne et al. |
| 2006/0209745 A1 | 9/2006 | MacMullan et al. |
| 2006/0251115 A1 | 11/2006 | Haque et al. |
| 2007/0014307 A1 | 1/2007 | Srinivasan et al. |
| 2007/0017976 A1 | 1/2007 | Peyret et al. |
| 2007/0054660 A1 | 3/2007 | Cardina et al. |
| 2007/0088818 A1 | 4/2007 | Roberts et al. |
| 2007/0094279 A1 | 4/2007 | Mittal et al. |
| 2007/0121651 A1 | 5/2007 | Casey et al. |
| 2007/0127644 A1 | 6/2007 | Tischer et al. |
| 2007/0178900 A1 | 8/2007 | Frank |
| 2007/0206592 A1 | 9/2007 | Itakura et al. |
| 2007/0268922 A1 | 11/2007 | Dougan et al. |
| 2007/0291921 A1 | 12/2007 | Fleischer et al. |
| 2008/0020734 A1 | 1/2008 | Smith et al. |
| 2008/0192768 A1 | 8/2008 | Tischer et al. |
| 2008/0192769 A1 | 8/2008 | Tischer et al. |
| 2008/0194208 A1 | 8/2008 | Tischer et al. |
| 2008/0194225 A1 | 8/2008 | Tischer et al. |
| 2008/0194251 A1 | 8/2008 | Tischer et al. |
| 2008/0195641 A1 | 8/2008 | Tischer et al. |
| 2008/0207178 A1 | 8/2008 | Tischer et al. |
| 2008/0207179 A1 | 8/2008 | Tischer et al. |
| 2008/0207197 A1 | 8/2008 | Tischer et al. |
| 2008/0207202 A1 | 8/2008 | Zellner et al. |
| 2008/0220775 A1 | 9/2008 | Tischer et al. |
| 2008/0220776 A1 | 9/2008 | Tischer et al. |
| 2008/0228600 A1 | 9/2008 | Treyz et al. |
| 2008/0301231 A1 | 12/2008 | Mehta et al. |
| 2008/0317063 A1 | 12/2008 | Enzmann et al. |
| 2011/0026436 A1 | 2/2011 | Karaguz et al. |

FOREIGN PATENT DOCUMENTS

| | | |
|---|---|---|
| GB | 2253119 | 8/1992 |
| GB | 2283881 | 5/1995 |
| GB | 2285556 | 7/1995 |
| JP | 11355451 | 12/1999 |
| WO | WO 9828929 | 7/1998 |
| WO | WO 0158181 | 8/2001 |

OTHER PUBLICATIONS

U.S. Office Action dated Sep. 26, 2000 in U.S. Appl. No. 09/126,268.
U.S. Office Action dated Jul. 5, 2001 in U.S. Appl. No. 09/126,268.
U.S. Notice of Allowance dated Jun. 21, 2002 in U.S. Appl. No. 09/126,268.
U.S. Office Action dated Oct. 25, 2000 in U.S. Appl. No. 09/268,591.
U.S. Office Action dated May 1, 2001 in U.S. Appl. No. 09/268,591.
U.S. Notice of Allowance dated Oct. 23, 2001 in U.S. Appl. No. 09/268,591.
U.S. Office Action dated Jul. 7, 2004 in U.S. Appl. No. 09/999,806.
U.S. Office Action dated Nov. 30, 2005 in U.S. Appl. No. 09/999,806.
U.S. Notice of Allowance dated Mar. 23, 2005 in U.S. Appl. No. 09/999,806.
U.S. Notice of Allowance dated Apr. 5, 2006 in U.S. Appl. No. 09/999,806.
U.S. Notice of Allowance dated Aug. 7, 2006 in U.S. Appl. No. 09/999,806.
U.S. Office Action dated Sep. 23, 2004 in U.S. Appl. No. 10/195,197.
U.S. Office Action dated May 25, 2005 in U.S. Appl. No. 10/195,197.
U.S. Office Action dated Dec. 16, 2005 in U.S. Appl. No. 10/195,197.
U.S. Office Action dated Apr. 28, 2006 in U.S. Appl. No. 10/195,197.
U.S. Notice of Allowance dated Jan. 4, 2007 in U.S. Appl. No. 10/195,197.
U.S. Office Action dated Jan. 28, 2004 in U.S. Appl. No. 10/036,206.
U.S. Office Action dated Jul. 19, 2004 in U.S. Appl. No. 10/036,206.
U.S. Office Action dated May 5, 2005 in U.S. Appl. No. 10/036,206.
U.S. Office Action dated Dec. 23, 2005 in U.S. Appl. No. 10/036,206.
U.S. Notice of Allowance dated Jan. 4, 2005 in U.S. Appl. No. 10/036,206.
U.S. Notice of Allowance dated Sep. 7, 2005 in U.S. Appl. No. 10/036,206.
U.S. Notice of Allowance dated Apr. 6, 2006 in U.S. Appl. No. 10/036,206.
U.S. Office Action dated Aug. 15, 2003 in U.S. Appl. No. 10/055,212.
U.S. Notice of Allowance dated Feb. 24, 2004 in U.S. Appl. No. 10/055,212.
U.S. Notice of Allowance dated Jul. 3, 2006 in U.S. Appl. No. 10/851,932.
U.S. Office Action dated Mar. 6, 2008 in U.S. Appl. No. 10/929,317.
U.S. Office Action dated Dec. 9, 2008 in U.S. Appl. No. 10/929,317.
U.S. Notice of Allowance dated Aug. 6, 2009 in U.S. Appl. No. 10/929,317.
U.S. Office Action dated Apr. 26, 2006 in U.S. Appl. No. 10/929,711.

(56) References Cited

OTHER PUBLICATIONS

U.S. Notice of Allowance dated Oct. 30, 2006 in U.S. Appl. No. 10/929,711.
U.S. Office Action dated Mar. 6, 2008 in U.S. Appl. No. 10/929,712.
U.S. Notice of Allowance dated Dec. 15, 2008 in U.S. Appl. No. 10/929,712.
U.S. Office Action dated Mar. 5, 2008 in U.S. Appl. No. 10/929,715.
U.S. Office Action dated Jun. 19, 2008 in U.S. Appl. No. 10/929,715.
U.S. Office Action dated Apr. 13, 2009 in U.S. Appl. No. 10/929,715.
U.S. Notice of Allowance dated Sep. 23, 2009 in U.S. Appl. No. 10/929,715.
U.S. Office Action dated Nov. 30, 2005 in U.S. Appl. No. 11/048,132.
U.S. Office Action dated Jun. 20, 2006 in U.S. Appl. No. 11/048,132.
U.S. Notice of Allowance dated Feb. 23, 2007 in U.S. Appl. No. 11/048,132.
U.S. Office Action dated Apr. 11, 2007 in U.S. Appl. No. 11/322,532.
U.S. Notice of Allowance dated Jul. 26, 2007 in U.S. Appl. No. 11/322,532.
U.S. Notice of Allowance dated Oct. 23, 2007 in U.S. Appl. No. 11/322,532.
U.S. Office Action dated Oct. 7, 2008 in U.S. Appl. No. 11/323,180.
U.S. Office Action dated May 12, 2009 in U.S. Appl. No. 11/323,180.
U.S. Office Action dated Oct. 1, 2009 in U.S. Appl. No. 11/323,180.
U.S. Office Action dated May 13, 2010 in U.S. Appl. No. 11/323,180.
U.S. Office Action dated Jan. 23, 2008 in U.S. Appl. No. 11/323,181.
U.S. Office Action dated Sep. 30, 2008 in U.S. Appl. No. 11/323,181.
U.S. Office Action dated Feb. 19, 2009 in U.S. Appl. No. 11/323,181.
U.S. Office Action dated Aug. 20, 2009 in U.S. Appl. No. 11/323,181.
U.S. Office Action dated Jan. 16, 2009 in U.S. Appl. No. 11/323,182.
U.S. Office Action dated Jul. 20, 2009 in U.S. Appl. No. 11/323,182.
U.S. Office Action dated Oct. 30, 2008 in U.S. Appl. No. 11/323,185.
U.S. Office Action dated May 18, 2009 in U.S. Appl. No. 11/323,185.
U.S. Office Action dated Oct. 23, 2009 in U.S. Appl. No. 11/323,185.
U.S. Office Action dated Jun. 3, 2010 in U.S. Appl. No. 11/323,185.
U.S. Office Action dated Oct. 15, 2008 in U.S. Appl. No. 11/323,186.
U.S. Office Action dated May 12, 2009 in U.S. Appl. No. 11/323,186.
U.S. Office Action dated Oct. 1, 2009 in U.S. Appl. No. 11/323,186.
U.S. Office Action dated Jul. 21, 2010 in U.S. Appl. No. 11/323,186.
U.S. Office Action dated Jan. 21, 2009 in U.S. Appl. No. 11/323,818.
U.S. Office Action dated Sep. 11, 2009 in U.S. Appl. No. 11/323,818.
U.S. Office Action dated Mar. 14, 2008 in U.S. Appl. No. 11/323,820.
U.S. Office Action dated Nov. 17, 2008 in U.S. Appl. No. 11/323,820.
U.S. Office Action dated Apr. 22, 2009 in U.S. Appl. No. 11/323,820.
U.S. Office Action dated Nov. 10, 2009 in U.S. Appl. No. 11/323,820.
U.S. Notice of Allowance dated Apr. 16, 2010 in U.S. Appl. No. 11/323,820.
U.S. Office Action dated Apr. 1, 2008 in U.S. Appl. No. 11/323,825.
U.S. Office Action dated Sep. 16, 2008 in U.S. Appl. No. 11/323,825.
U.S. Office Action dated Mar. 5, 2009 in U.S. Appl. No. 11/323,825.
U.S. Office Action dated Jun. 23, 2009 in U.S. Appl. No. 11/323,825.
U.S. Office Action dated Dec. 16, 2009 in U.S. Appl. No. 11/323,825.
U.S. Office Action dated Mar. 17, 2008 in U.S. Appl. No. 11/324,033.
U.S. Office Action dated Dec. 23, 2008 in U.S. Appl. No. 11/324,033.
U.S. Office Action dated Jun. 2, 2009 in U.S. Appl. No. 11/324,033.
U.S. Notice of Allowance dated Sep. 18, 2009 in U.S. Appl. No. 11/324,033.
U.S. Office Action dated Mar. 28, 2008 in U.S. Appl. No. 11/324,034.
U.S. Office Action dated Oct. 3, 2008 in U.S. Appl. No. 11/324,034.
U.S. Office Action dated Apr. 14, 2009 in U.S. Appl. No. 11/324,034.
U.S. Office Action dated Nov. 30, 2009 in U.S. Appl. No. 11/324,034.
U.S. Office Action dated Jul. 7, 2010 in U.S. Appl. No. 11/324,034.
U.S. Office Action dated Jan. 19, 2011 in U.S. Appl. No. 11/324,034.
U.S. Office Action dated Feb. 5, 2009 in U.S. Appl. No. 11/324,149.
U.S. Office Action dated Jul. 22, 2009 in U.S. Appl. No. 11/324,149.
U.S. Office Action dated Mar. 11, 2008 in U.S. Appl. No. 11/324,154.
U.S. Office Action dated Dec. 30, 2008 in U.S. Appl. No. 11/324,154.
U.S. Office Action dated Jul. 9, 2009 in U.S. Appl. No. 11/324,154.
U.S. Office Action dated Oct. 5, 2009 in U.S. Appl. No. 11/324,154.
U.S. Office Action dated May 11, 2010 in U.S. Appl. No. 11/324,154.
U.S. Office Action dated Jul. 6, 2007 in U.S. Appl. No. 11/637,264.
U.S. Office Action dated Apr. 8, 2008 in U.S. Appl. No. 11/637,264.
U.S. Office Action dated Sep. 18, 2008 in U.S. Appl. No. 11/637,264.
U.S. Office Action dated May 13, 2009 in U.S. Appl. No. 11/637,264.
U.S. Office Action dated Sep. 30, 2009 in U.S. Appl. No. 11/637,264.
U.S. Office Action dated Sep. 29, 2010 in U.S. Appl. No. 11/637,264.
U.S. Notice of Allowance dated Dec. 27, 2010 in U.S. Appl. No. 11/637,264.
U.S. Notice of Allowance dated Apr. 15, 2011 in U.S. Appl. No. 11/637,264.
U.S. Office Action dated Oct. 15, 2009 in U.S. Appl. No. 11/733,525.
U.S. Office Action dated Apr. 16, 2010 in U.S. Appl. No. 11/733,525.
U.S. Office Action dated Oct. 27, 2010 in U.S. Appl. No. 11/733,525.
U.S. Notice of Allowance dated Jun. 23, 2011 in U.S. Appl. No. 11/733,525.
U.S. Office Action dated Feb. 7, 2011 in U.S. Appl. No. 11/952,510.
U.S. Office Action dated Sep. 14, 2011 in U.S. Appl. No. 11/952,510.
U.S. Office Action dated Jan. 30, 2012 in U.S. Appl. No. 11/952,510.
U.S. Office Action dated Dec. 5, 2012 in U.S. Appl. No. 11/952,510.
U.S. Notice of Allowance dated Jun. 26, 2013 in U.S. Appl. No. 11/952,510.
U.S. Office Action dated Nov. 22, 2010 in U.S. Appl. No. 12/639,313.
U.S. Notice of Allowance dated Mar. 8, 2011 in U.S. Appl. No. 12/639,313.
U.S. Notice of Allowance dated Apr. 14, 2011 in U.S. Appl. No. 12/639,313.
U.S. Office Action dated Jul. 7, 2010 in U.S. Appl. No. 12/639,448.
U.S. Office Action dated Feb. 4, 2011 in U.S. Appl. No. 12/639,448.
U.S. Notice of Allowance dated May 17, 2011 in U.S. Appl. No. 12/639,448.
U.S. Office Action dated Oct. 29, 2010 in U.S. Appl. No. 12/640,073.
U.S. Office Action dated Mar. 11, 2011 in U.S. Appl. No. 12/640,073.
U.S. Office Action dated Oct. 14, 2010 in U.S. Appl. No. 12/642,288.
U.S. Office Action dated Mar. 21, 2011 in U.S. Appl. No. 12/642,288.
U.S. Office Action dated Jun. 17, 2011 in U.S. Appl. No. 12/642,288.
U.S. Notice of Allowance dated Nov. 14, 2011 in U.S. Appl. No. 12/642,288.
U.S. Office Action dated Sep. 14, 2010 in U.S. Appl. No. 12/759,767.
U.S. Office Action dated Mar. 2, 2011 in U.S. Appl. No. 12/759,767.
U.S. Office Action dated Jun. 26, 2012 in U.S. Appl. No. 12/759,767.
U.S. Notice of Allowance dated Nov. 16, 2012 in U.S. Appl. No. 12/759,767.
U.S. Notice of Allowance dated Dec. 23, 2010 in U.S. Appl. No. 12/837,785.
U.S. Notice of Allowance dated Mar. 29, 2011 in U.S. Appl. No. 12/837,785.
U.S. Office Action dated Oct. 11, 2012 in U.S. Appl. No. 12/854,475.
U.S. Office Action dated Sep. 30, 2010 in U.S. Appl. No. 12/874,450.
U.S. Office Action dated Apr. 13, 2011 in U.S. Appl. No. 12/874,450.
U.S. Office Action dated May 22, 2012 in U.S. Appl. No. 12/874,450.
U.S. Office Action dated Nov. 14, 2012 in U.S. Appl. No. 12/874,450.
U.S. Office Action dated Aug. 19, 2011 in U.S. Appl. No. 12/909,145.
U.S. Office Action dated Feb. 3, 2012 in U.S. Appl. No. 12/909,145.
U.S. Office Action dated Jun. 11, 2012 in U.S. Appl. No. 12/909,145.
U.S. Office Action dated Nov. 21, 2012 in U.S. Appl. No. 12/909,145.
U.S. Office Action dated May 4, 2012 in U.S. Appl. No. 13/089,577.
U.S. Office Action dated Feb. 16, 2012 in U.S. Appl. No. 13/249,977.
U.S. Office Action dated Sep. 25, 2012 in U.S. Appl. No. 13/249,977.
U.S. Notice of Allowance dated Apr. 4, 2013 in U.S. Appl. No. 13/249,977.
U.S. Office Action dated Mar. 31, 2009 in U.S. Appl. No. 11/554,186.
(Spec Sheet) AdvanceTec—AdvanceCommunicator®—Nokia Product Sheet; printed Jan. 2006, 1 page.
(Spec Sheet) AdvanceTec—OEM Services; AdvanceTec—The Company; printed Jan. 2006, 1 page.
(Spec Sheet) Bluetooth Enabled Technology; ELBT595; printed Jan. 2006, 1 page.
(Spec Sheet) Cell Antenna—Introducing CELLDOCK; Mar. 16, 2005, 1 page.
(Spec Sheet) MERGE by Cidco Communications—Merge for Motorola®; Design & Engineering Showcase Honors 2004; printed Jan. 2006, 2 pages.
(Spec Sheet) Motorola SD 4505 System Expansion Cellular Phone Docking Station; page last updated Apr. 12, 2005; 1 page.

(56) References Cited

OTHER PUBLICATIONS (Spec Sheet) RCA 23200RE3—RCA Multi-Handset cell Docking System; Revised Jun. 6, 2005; 2 pages.
AdvanceTec, The AdvanceTec Solution, Cellular Hands-Free Solution: The Pro-Installed Hands Free, printed Jan. 2006, pp. 1-4.
CellAntenna Corporation: Cellular Antennas, accessories, cellphone products, www.cellantenna.com; CellAntenna Corporation; printed Sep. 26, 2002.
Cellsocket, Welcome to WHP Wireless, www.libretel.net/welcome.html; printed Aug. 17, 2005; 1 page.
CellSocket, www.cellantenna.com/Dockingstations/cellsocket.htm; Cell Antenna Corporation, printed Sep. 26, 2002.
Cellular Docking Station for Nokia Motorola Star Teac and Erickson Cellular Phones, www.cellantenna.com/Dockingstations/dockingstations.htm, CellAntenna Corporation, Sep. 26, 2002.
http://www.hometoys.com/news.php4?section=enhancedview&id=17792169; printed Aug. 17, 2005; 3 pages.
MercuryNews.com, Dock makes cell convenient at home, Jul. 25, 2005, www.timesleader.com/mld/timesleader/business/technology/12216277.htm, printed Aug. 17, 2005; 4 pages.
Motorola, SD4505—Cell phone dock module for SD4500 Series, printed Aug. 17, 2005, pp. 1-2.
PhoneLabs, PhoneLabs Products, printed Aug. 17, 2005, pp. 1-2.
RCA Communications, RCA Cell Docking System 23200RE3, printed Aug. 17, 2005, pp. 1-2.
RCA, Innovative RCA Cell Docking System Allows cell Users to Make and Receive Calls Through a Home Phone, printed Aug. 17, 2005, pp. 1-3.
Telular Corporation—2004 Annual Report, Making Wireline Replacement a Reality, pp. 1-58, 76 pages total.
Thomson Group, Annual Report, Jun. 3, 2005, pp. 1-180.
Thomson Group, Index to Consolidated Financial Statement, Jun. 3, 2005, F1-F7, 150 pages total.
VOX2 Cellphone Base Station Model No. 131, Vox.Link User Guide, Rev. 1.02., printed Jan. 2006, 1 page.
VOX2 Voxlink Cellphone Docking Station, www.cellantenna.com/Dockingstations/VOX2dockingstation.htm; CellAntenna Corporation, printed Sep. 26, 2002.
Applicant's Statement in Information Disclosure Statement, regarding VoxLink/Vox2 system on sale at least before Jul. 15, 2002.
Thomson—2004 Form 20-F—Partner to the Media & Entertainment Industries; 180 pages; Index to Consolidated Financial Statements; 148 pages.
Applicant's Statement from Information Disclosure Statement for U.S. Appl. No. 09/999,806.
International Application No. PCT/US02/40523 International Preliminary Examination Report completed Jul. 28, 2004.
International Application No. PCT/US02/40523 International Search Report mailed Apr. 10, 2003.

\* cited by examiner

CELLULAR DOCKING STATION

CROSS-REFERENCE TO RELATED APPLICATIONS

This application is a continuation of U.S. application Ser. No. 11/952,510, filed Dec. 7, 2007, and issued as U.S. Pat. No. 8,583,106, on Nov. 12, 2013, which is a continuation of U.S. application Ser. No. 11/322,532, filed Dec. 30, 2005, and issued as U.S. Pat. No. 7,363,034, on Apr. 22, 2008, which is a continuation of U.S. application Ser. No. 09/999,806, filed Oct. 24, 2001, and issued as U.S. Pat. No. 7,149,514, on Dec. 12, 2006, which is a continuation of U.S. application Ser. No. 09/126,268, filed Jul. 30, 1998, and issued as U.S. Pat. No. 6,480,714, on Nov. 12, 2002, which claims the benefit of Provisional Application No. 60/054,238, filed Jul. 30, 1997. These applications are all incorporated herein by reference in their entireties.

FIELD OF THE INVENTION

This invention relates in general to telephonic communications and more particularly relates to cellular communications via a docking station.

BACKGROUND OF THE INVENTION

In recent years, the vast majority of the industrialized world has become telephonically accessible via public switched telephone networks (PSTNs). Nonetheless, there remain significant populations in rural or less developed areas who are not accessible via a PSTN for a variety of reasons relating to economy and geography. In such areas, remote communication has been accomplished by radio communications systems or cellular mobile radiotelephone (CMR) systems.

A conventional radio communications system uses a base station transceiver located at a site for favorable radio propagation and a set of transceivers typically located in remote areas. Most radio communication systems of this type are useful for conducting communications between short distances, such as within the boundaries of a town or city, via a very high frequency (VHF) radio link.

Although conventional radio communications systems are useful for specialized communications applications, two-way radios are not widely accepted for general purpose communications. In many locations, the use of two-way radios is governmentally regulated and the allocated frequency spectrum is relatively limited. Furthermore, the quality of communications is subject to the propagation conditions between communications sites. Additionally, two-way radio equipment is generally large and heavy and, as a result, is unlikely to be carried by a user at all times or to be installed in small or existing equipment.

Another form of two-way communication is a CMR system. Typical CMR systems are characterized by dividing a radio coverage area into smaller coverage areas or "cells" using low power transmitters and coverage-restricted receivers. As shown in U.S. Pat. Nos. 3,906,166 and 4,268,722, the limited coverage area enables the radio channels used in one cell to be reused in another cell. As a cellular mobile radiotelephone within one cell moves across the boundary of the cell and into an adjacent cell, control circuitry associated with the cells detects that the signal strength of the radiotelephone in the just-entered cell is stronger, and communications with the radiotelephone are "handed off" to the just-entered cell. Thus, a CMR system can supply two-way communications for an array of cells, thereby supplying communications for a much wider area than conventional two-way radios.

Use of cellular mobile radiotelephones can pose an appreciable expense to the user. Initially, a cellular mobile radiotelephone must be purchased and an initial registration fee paid to a cellular carrier providing service to the geographic area where the handset will be used. A telephone number is assigned to the newly purchased radiotelephone and a "handset I.D." is established by the carrier and maintained within the CMR system. The handset I.D. identifies communications from that particular radiotelephone as coming from a subscriber to the cellular carrier's services.

Beyond the initial purchase and cellular carrier connection fees, expenses incurred in ordinary use of such a radiotelephone are even more significant. Historically, every communication placed from a radiotelephone is processed through the CMR system without regard for the location of the radiotelephone when the call is placed. Such processing incurs a combination of usage fees and toll or roamer charges. These fees vary depending upon the location of the radiotelephone relative to the geographic coverage area of the cellular carrier's services subscribed to, as well as other time and geographic related variables. In a basic case, a radiotelephone user who subscribes to a cellular carrier's services in Atlanta and who places a call from within his area of geographical coverage to a party, also located in Atlanta and within the same geographical coverage area, would be assessed a fee for accessing the CMR system, in addition to a per minute usage fee. The same call placed from a conventional telephone linked directly to the PSTN would be deemed a "local call" and would typically generate no per call fees. In a more extreme case, the same subscriber to a cellular service having a geographical service area in Atlanta who is on vacation in Los Angeles and desires to use his radiotelephone to place a call from his hotel room to a restaurant across the street will incur roamer charges for accessing the CMR system outside of his carrier's geographical coverage area, a fee for relaying the call from Los Angeles back to his carrier's mobile switching center in the Atlanta area, a fee for relaying the call from Atlanta back to the restaurant across the street from the caller in Los Angeles, all in addition to a per minute usage fee. Again, had the subscriber placed this call from his hotel room to the restaurant across the street via a conventional telephone linked directly to the PSTN, the call would have been deemed "local" and would have incurred no carrier-related fees.

Until recently, individuals in areas without direct access to the PSTN but desiring telephonic capability were essentially limited to costly and inconvenient CMR systems. Some of the inconvenience of using a home-based radiotelephone have been addressed with the advent of so-called fixed wireless (FWL) systems. FWL systems typically comprise a conventional cellular telephone physically connected to one or more conventional telephone handsets within a discrete location, such as a residence or office. The FWL system allows the connected conventional telephone handsets to access the CMR system through the cellular telephone to which they are connected. Even FWL systems, though, allow virtually no freedom of movement for the user and do not resolve other problems typically associated with CMR systems, including high cost of operation.

Accordingly, there is a need to provide individuals who do not have access to the PSTN a way to communicate telephonically in a reliable and cost-efficient manner. Additionally, there is a need to adapt current FWL systems so as to facilitate the use of such systems in conjunction with existing PSTN elements. Furthermore, there is a need to develop safeguards sufficient to prevent individuals who do not subscribe to a wireless system from gaining unauthorized access to the system, regarding both incoming and outgoing communications.

SUMMARY OF THE INVENTION

The present invention allows individuals who do not have direct access to a PSTN to communicate from, and receive communication at, their homes or another predetermined fixed location telephonically in a convenient and inexpensive manner. More particularly, the preferred form of the present invention is accomplished by utilizing a communications interface in cooperation with elements found in typical cellular mobile radiotelephone (CMR) and fixed wireless (FWL) systems. The methodology of the present invention defines the interaction of the communications interface with the CMR and FWL systems to deliver communications through a PSTN conveniently and inexpensively. More particularly, the present invention allows a conventional telephone handset to communicate through a typical cellular telephone.

The communications interface comprises three basic elements which allow communication by conventional telephone handsets through the cellular telephone. The conventional telephone handsets are connected to a Telephony Support Unit (TSU) within the communications interface. The TSU is connected to a communications interface controller (CIC) which is, in turn, connected to a Mobile Telephone Interface Unit (MTIU). These components, in combination, perform the basic functions of the communications interface.

Specifically, a subscriber to a communications system which includes the communications interface for CMR and FWL systems initiates an outgoing communication from a telephone handset connected to the communications interface. The outgoing communication is passed to the communications interface via a standard telephone cable connected at one end to the telephone handset, and at its other end to the communications interface using a connector such as an RJ-11 type.

Upon delivery of the outgoing communication, the TSU receives the outgoing communication. If communications from telephone handsets are received by the TSU simultaneously, the TSU arbitrates the communications as to priority. In other words, the TSU determines which outgoing communication to accept based on priority. Following arbitration, the TSU provides notification to the originator of one of the outgoing communications of the unavailability of the communications interface to place that communication. The TSU then forwards the remaining outgoing communication to the CIC.

The CIC is connected to the TSU and, upon completion of the functions of the TSU specified above and forwarding of the outgoing communication to the CIC, the CIC receives the outgoing communication and determines whether a cellular telephone registered for operation with the communications interface is communicatively connected to the communications interface. For one aspect of the present invention, the cellular telephone must be physically connected to the communications interface to further process the outgoing communication. Alternatively, the communications interface can determine whether the cellular telephone is within a predetermined proximate range of the communications interface. If so, the outgoing communication is processed and ultimately transmitted to the cellular telephone which, in turn, transmits the outgoing communication via the CMR system.

If the CIC determines that the cellular telephone is not in communicative contact with the communications interface, an indication as such is originated by the CIC and forwarded back through the TSU to the telephone handset to inform the user. If, on the other hand, the CIC determines that the cellular telephone is in communicative contact with the communications interface and that the cellular telephone is neither already in use nor unavailable for any other reason, the CIC processes the outgoing communication. This process appends the telephone exchange number to which the outgoing communication is directed with an identifier unique to that particular communications interface. Once appended, the outgoing communication is forwarded via a suitable communications link to the MTIU.

The MTIU includes a physical interface for connection of the cellular telephone to the communications interface. The MTIU receives the forwarded outgoing communication from the CIC and passes it to the cellular telephone via any one of a number of well known interfaces, such as an RJ-11 connector, one portion of which is connected to the MTIU, and the mating portion of which is integral to the cellular telephone.

Once the outgoing communication is received indicating that the cellular telephone is in communicative contact with the communications interface, the MTIU forwards the outgoing communication, preceded by the appended telephone exchange number to which the outgoing communication is directed, to the cellular telephone. The cellular telephone receives the outgoing communication from the telephone handset through the communications interface, and awaits a "send event" recognizable to the cellular telephone as a command to "send" the outgoing communication. Once the "send event" occurs, the cellular telephone transmits the outgoing communication to the CMR system in a well known manner.

The CMR system receives and processes the outgoing communication in the manner of conventional cellular communication. During processing, the Mobile Switching Center (MSC) recognizes the identifier appended to the telephone exchange number as indicating that the outgoing communication originated from the communications interface. In response to this recognition, the MSC directs an authentication unit to verify the origin of the outgoing communication. In response to this instruction from the MSC, the authentication unit authenticates the outgoing communication in a known manner.

One authentication method is the "seed and response" type, in which the authentication unit transmits a numerical sequence to the communications interface. The communications interface, upon receipt of the numerical sequence, performs a predetermined, unique algorithmic function on the numerical sequence before transmitting back to the authentication unit the result of the manipulation of the number sequence (first manipulated number sequence). Concurrently, the authentication unit, which contains a database in which a list of subscribing communications interfaces and their unique algorithmic functions are maintained, determines the proper algorithmic function corresponding to the appendage to the telephone exchange number of the outgoing communication. The authentication unit then performs the proper algorithmic function on the same number sequence sent to the communications interface, resulting in a second manipulated number sequence.

If the authentication unit does not receive a response, or receives from the communications interface any response other than the first manipulated number sequence which matches the second manipulated number sequence, the authentication unit informs the MSC and the MSC routes the outgoing communication to its intended recipient via a telephone cable trunk allocated for use by non-users of the communications interface. If, on the other hand, the first and second manipulated number sequences match, the authentication unit indicates such to the MSC which, in turn, directs the outgoing communication to its intended recipient via a specially designated telephone cable trunk reserved for use by users of the communications interface. A record of the disposition of each authentication procedure, along with a record of which telephone cable trunk each outgoing communication was eventually routed to, is maintained within the CMR system.

Communications incoming to the CMR system are also distinguished based on whether the incoming communication is directed to a user of the communications interface. For example, telephone exchange numbers corresponding to users of the communications interface can be maintained in a database within the CMR system. Prior to forwarding the incoming communication to the selected cellular telephone, the telephone exchange number of the incoming communication is compared to telephone exchange numbers stored in the database.

If the telephone exchange number of the incoming communication corresponds to an entry in the database, the CMR system queries the cell site in which the selected cellular telephone is registered for operation as to whether the selected cellular telephone is presently located within that particular cell cite. If so, a record of the telephone exchange number of the incoming communication corresponding to the database entry, as well as the presence of the selected cellular telephone in its cell cite of registration, is created and maintained within the CMR system. Thereafter, the incoming communication is forwarded to the selected cellular telephone. This authentication can occur separately or in conjunction with an additional authentication step, such as the "seed and response" type.

If, on the other hand, either the telephone exchange number of the incoming communication does not correspond to a database entry indicating use of the communications interface or the selected cellular telephone is not within its cell site of registration, a separate record to this effect is created. The incoming communication is then forwarded to the selected cellular telephone. Upon receipt of the incoming communication by the selected cellular telephone, an indication is forwarded through the communications interface to the connected telephone handsets to permit either the selected cellular telephone or any connected telephone handset to respond to the incoming communication.

That the present invention and the preferred embodiments thereof overcome the drawbacks set forth above and accomplish the advantages of the invention set forth herein will become apparent from the detailed description, the appended claims and the drawings.

DETAILED DESCRIPTION

Figure 1:
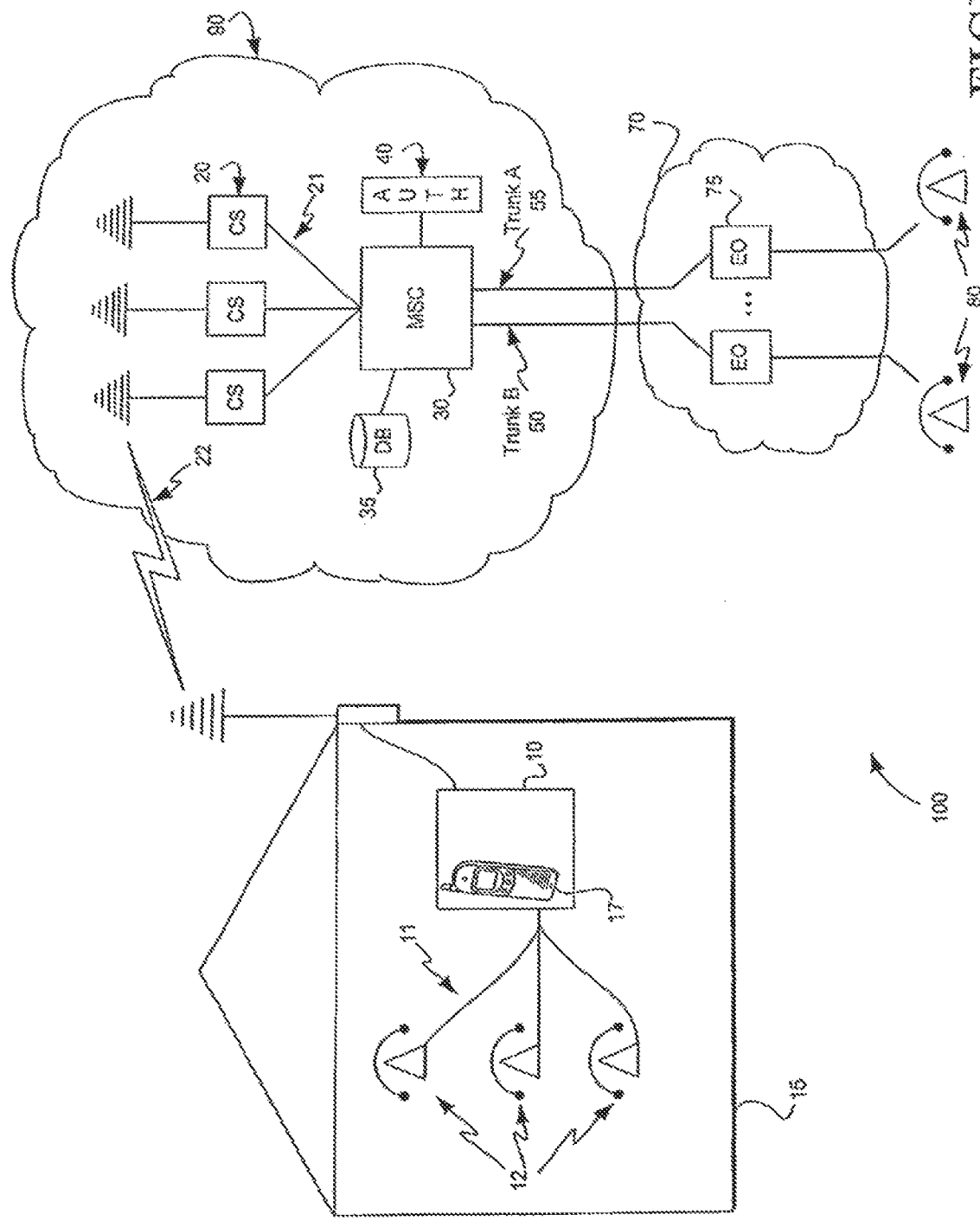
FIG. 1 is a block diagram illustrating the preferred environment for an exemplary embodiment of the present invention.

Referring now to the drawings, in which like numerals indicate like elements throughout the several figures, FIG. 1 is a block diagram illustrating the preferred environment of the present invention, which includes a method and an apparatus for telephonic communication in regions not communicatively accessible via a public switched telephone network (PSTN) alone. Stated generally, one embodiment of the present invention receives an outgoing communication from a conventional telephone handset, appends the communication with a unique identifier and transmits the outgoing communication via a cellular mobile radiotelephone (CMR) system to the PSTN for delivery to a called party by way of a specially designated telephone cable trunk.

Referring to FIG. 1, the communication system 100 operates in conjunction with the CMR system 90 so as to take advantage of an existing wide area communications network and to avoid the expense of communicating with each individual cellular user via a dedicated conventional telephone facility or conventional two-way radios. The communication system 100 adapts the existing environment of the CMR system 90 to communicate voice or data information via the PSTN 70 in a manner which had previously only been achievable through use of more burdensome and expensive communication means such as two-way radios or conventional cellular communication.

The CMR system 90 typically includes a radio coverage area divided into smaller coverage areas known as a "cells" using low power transmitters and coverage-restricted receivers. As will be known to those skilled in the art, the limited coverage area allows the radio channels used in one cell to be reused in another cell. As a mobile radiotelephone within one cell moves across the boundary of the cell and into an adjacent cell, control circuitry associated with the cells detects that the signal strength of the mobile radiotelephone in the just-entered cell is stronger, and communications with the mobile radiotelephone are "handed off" to the just-entered cell. A plurality of cells are typically provided in a conventional cellular service operator's system. Conventional CMR systems typically comprise at least one mobile telephone switch coupled to an appropriate array of more or less identically equipped cell sites. Each cell site can contain at least one mobile switching center (MSC) 30, which normally couples telephone conversations involving mobile radiotelephones operating in the cell to a public switched telephone network (PSTN) 70 or to other radiotelephones operating within the CMR system 90.

The PSTN 70 included in an exemplary embodiment of the communications system 100 includes Advanced Intelligent Network (AIN) elements as described generally in U.S. Pat. No. 5,430,719 to Weisser, Jr., which is incorporated by reference herein. Elements taught therein should be regarded as elements of the PSTN 70. For the purpose of the discussion of the present invention, it is noted that PSTN 70 includes a plurality of communicatively connected end offices 75 accessible by the CMR system 90. A communication can be initiated via the PSTN 70 by connection to the end offices 75 by a variety of devices 80 such as telephones and facsimile machines.

Communication between the typical CMR system 90 and the cells is accomplished through a plurality of mobile telephone switching offices, such as the MSC 30. The MSC 30 can communicate with a particular cell by a communications link 21 to a cell site 20. A communication from either the PSTN 70 or CMR system 90 is received by the MSC 30. In response, the MSC 30 relays the communication to one or more cell sites 20 in which a radiotelephone 17 of the intended recipient of the communication was last registered. Transmission of the communication from the cell site 20 to the radiotelephone 17 occurs via communications link 22. For simplification of illustration, one MSC 30 along with its associated cell sites 20 will be used as an example to illustrate the operation of the communication system.

Figure 2:
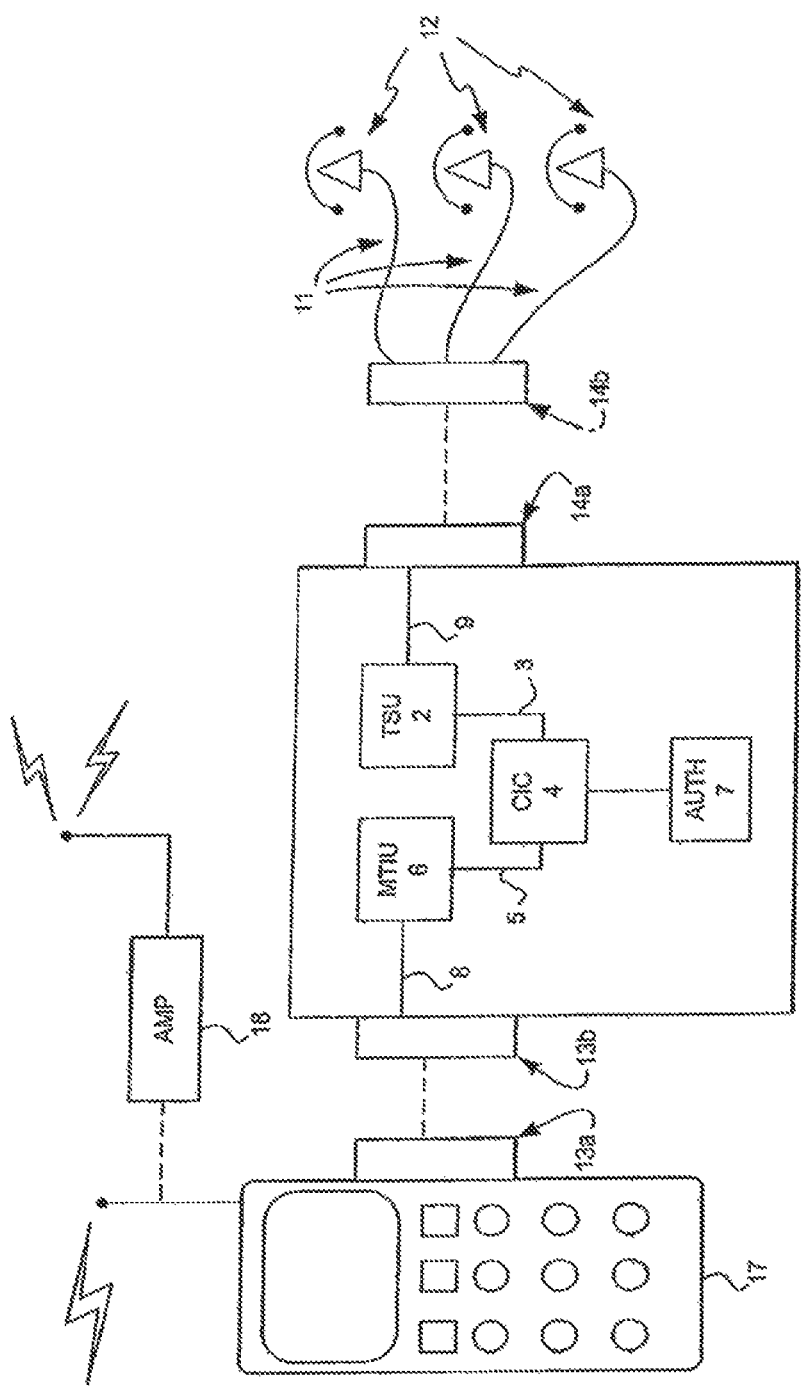
FIG. 2 is a block diagram illustrating a communications interface of an exemplary embodiment of the present invention.

The communication system can be activated by an individual desiring to place an outgoing communication from a home 15 by picking up a conventional telephone handset 12. The telephone handset 12 is connected, by typical telephone wiring 11, to a communications interface 10, located within the home 15. The connection between telephone wiring 11 and communications interface 10 is completed by use of any suitable connector, illustrated by mating connector portions 14a and 14b of FIG. 2. Preferably, connectors 14a and 14b are capable of accommodating transfer of voice and data signals, such as an RJ-11 type. Upon receipt of the outgoing communication by communications interface 10 via connectors 14a and 14b, communications link 9 delivers the outgoing communication to a telephone support unit (TSU) 2.

The TSU 2 determines whether the outgoing communication is the only communication outgoing from the various connected telephone handsets 12 via telephone wiring 11. If more than one outgoing communication is essentially simultaneously received by the TSU 2, the TSU 2 arbitrates priority between concurrent outgoing communications, with priority given to the first-placed outgoing communication. Telephone handsets 12 from which subsequent outgoing communications were attempted are notified by the TSU 2 of the unsuccessful completion of their attempted outgoing communication. Upon completion of this arbitration process, TSU 2 forwards the outgoing communication to a communications interface controller (CIC) 4, also located within the communications interface, via a communications link 3.

The CIC 4 receives the outgoing communication and first determines whether the cellular telephone 17 registered for operation with the communications interface 10 is communicatively connected to the communications interface 10. In this embodiment of the present invention, the communications interface 10 acts as a cellular docking station. Accordingly, the cellular telephone 17 must be physically connected to the communications interface 10 for the processing of the outgoing communication to continue. The determination as to whether the cellular telephone 17 is so connected occurs when the CIC 4 sends a verification signal through a communications link 5 to a mobile telephone interface unit (MTIU) 6, which relays the verification signal to an external connector portion 13b. When the cellular telephone 17 and communications interface 10 are physically connected, the connection occurs via mating connector portions 13a and 13b. Connector portion 13a is integral to the cellular telephone 17, and opposing connector portion 13b is integral to the communications interface 10. The verification signal sent by the CIC 4 detects whether mating connector portions 13a and 13b are mated and informs the CIC 4 accordingly.

Alternatively, physical connection between the cellular telephone 17 and the communications interface 10 is not necessary. Rather, the communications interface 10 is capable of operation through the cellular telephone 17 if the cellular telephone 17 is within close geographical proximity to the communications interface 10. In this embodiment, the CIC 4 determines whether the cellular telephone 17 is in close geographical proximity in a known manner such as detecting a periodic signal emanating from the cellular telephone 17, which periodic signal is only detectable at relatively short range. Another typical method of detection is accomplished by the CIC 4 transmitting, via a low power transmitter, a query to the cellular telephone 17. Upon receipt of the query from the CIC 4, the cellular telephone 17 responds, thereby indicating its presence in the geographical proximity defined by the broadcast range of the transceiver.

If the cellular telephone 17 is located so as to be in communicative contact with the communications interface 10, a further inquiry by the CIC 4 is made of the cellular telephone 17 to determine if the cellular telephone 17 is already in use. If the cellular telephone 17 is either not in communicative contact with the communications interface 10 or is currently in use, an indication to that effect is relayed back to the telephone handset 12 from which the outgoing communication originated.

If, on the other hand, the cellular telephone 17 is both communicatively accessible to the communications interface 10 and not currently in use, the CIC 4 appends the telephone exchange number to which the outgoing communication is directed to include an identifier unique to the particular communications interface 10. The CIC 4 then forwards the outgoing communication, preceded by the appended telephone exchange number, to the MTIU 6 via communications link 5. In the event that the outgoing communication originates with the cellular telephone itself, rather than the telephone handset 12, the telephone exchange number to which the outgoing communication is intended is similarly appended to include the unique identifier by routing the outgoing communication through the CIC 4 prior to transmission. The MTIU 6 then forwards the outgoing communication to the cellular telephone 17 via communication link 8 and mating connector portions 13a and 13b.

The cellular telephone 17 receives the outgoing communication and transmits the outgoing communication upon the occurrence of any one of two events. First, the outgoing communication may be transmitted upon activation of a "send" button or other manually activated key or sequence of keys on the keypad of the cellular telephone 17. This method of transmission can be used when the outgoing communication originates with the cellular telephone 17 rather than the telephone handset 12. Second, when the outgoing communication is originated by the telephone handset 12, the cellular telephone 17 will transmit the outgoing communication in response to the occurrence of a "send event". One such "send event" occurs upon the passage of a predetermined period of time following entry of the last digit of the telephone exchange number to which the outgoing communication is directed. Alternately, the cellular telephone will transmit the outgoing communication after a predetermined number of telephone exchange number digits have been entered through the keypad of the telephone handset 12.

In either case, during such passive initiation of the transmission of the outgoing communication by the cellular telephone 17, safeguards will insure that inadvertent transmissions are minimized. For instance, the period of time between keypad entry of the last digit of a telephone exchange number and attempted transmission of the outgoing communication would be such that an individual who pauses while dialing a number will usually not result in transmission of the outgoing communication. Similarly, logic internal to the CIC 4 of the communications interface 10 will differentiate between local, long distance domestic and long distance international calls, among others, which may require entry of a different number of digits from the keypad of the telephone handset 12.

In response to the occurrence of an event which triggers the transmission of the outgoing communication from the cellular telephone 17, examples of which are described above, the cellular telephone 17 transmits the outgoing communication to the CMR system in the manner of conventional cellular communications. In an alternate embodiment of the present invention, an amplifier 18 is connected to the output port of the cellular telephone 17 to provide greater range of transmission.

Referring back to FIG. 1, the CMR system 90 first receives the outgoing communication from the cellular telephone 17 at a cell site 20 in which the cellular telephone 17 is operating. The cell site 20 then forwards the outgoing communication to the MSC 30 via communications link 21. Upon receipt of the outgoing communication by the MSC 30, a determination is made as to whether the outgoing communication originated from a communications interface 10. First, the MSC 30 examines the telephone exchange number to which the outgoing communication is directed for the unique appendage which was added by the CIC 4 of the communications interface 10. The presence of the unique appendage indicates that the outgoing communication originated with a communications interface 10. If the unique appendage exists, the MSC 30 verifies the validity of the appendage by checking the appendage against a list of valid appendages maintained in a database 35, which is accessible by the MSC 30.

If the appendage to the telephone exchange number to which the outgoing communication is directed is not listed in the database 35 of valid appendages, the outgoing communication is routed to the public switched telephone network 70 via a telephone cable trunk 50. If, on the other hand, the appendage to the telephone exchange number to which the outgoing communication is directed corresponds to a valid appendage in the database 35, the MSC prompts an authentication unit 40 to perform an additional verification that the outgoing communication originates from a communications interface 10. The additional verification can be of the "seed and response" type, in which the authentication unit 40 transmits a numerical sequence to the communications interface 10. The communications interface 10, upon receipt of the numerical sequence, performs a predetermined algorithmic function on the numerical sequence before relaying back to the authentication unit 40 the result of the manipulation of the number sequence by the algorithmic function (first manipulated number sequence). Concurrently, the authentication unit 40, which contains a database in which a list of subscribing communications interfaces and their unique algorithmic functions are maintained, determines the proper algorithmic function corresponding to the appendage to the telephone exchange number of the outgoing communication. Thereafter, it performs the proper algorithmic function on the same number sequence sent to the communications interface 10, resulting in a second manipulated number sequence.

If the authentication unit 40 does not receive a response, or receives from the communications interface 10 any response other than the first manipulated number sequence which matches the second manipulated number sequence, the authentication unit 40 informs the MSC 30. The MSC 30 then routes the outgoing communication to its intended recipient via the telephone cable trunk 50, allocated for use by non-users of the communications interface. If, on the other hand, the first and second manipulated number sequences match, the authentication unit 40 has verified the outgoing communication as one which originated from a communications interface 10. The authentication unit 40 indicates such to the MSC 30 which, in turn, directs the outgoing communication to its intended recipient via a specially designated telephone cable trunk 55 reserved for use by users of the communications interface 10. A record of the disposition of each authentication procedure, along with a record of which telephone cable trunk each outgoing communication is routed to, is maintained within the CMR 90.

Communications incoming to the cellular telephone 17 through the CMR system 90 are also distinguished based on whether the incoming communication is directed to a user of the communications interface 10. In one embodiment, all telephone exchange numbers corresponding to users of a communications interface are maintained in the database 35 within the CMR system 90. An incoming communication, originating from a telephone handset 80 within the PSTN 70, is relayed from an end office 75 to the CMR system 90 via telephone trunk cables, such as 50 or 55. The incoming communication is received by the MSC 30 and the telephone exchange number to which the incoming communication is directed is compared to a list of telephone exchange numbers stored in database 35. The telephone exchange numbers in the database 35 correspond to authorized users of the communications interface 10. If the telephone exchange number to which the incoming communication is directed matches an entry in the database 35, the MSC 30 prompts the authentication unit 40 to perform a "seed and response" authentication, as discussed in conjunction with outgoing communications, above.

In the event that the seed and response authentication indicates that the incoming communication is directed to the authorized user of a communications interface 10, the MSC will query the cell sites 20 as to the particular cell in which the cellular telephone 17 is currently located. If, following successful authentication, the selected cellular telephone 17 is currently located within the particular cell site in which it is registered for operation and is available to receive the incoming communication, a record of the incoming communication is created and maintained within the CMR system 90. Information reflecting the successful authentication is also included in the record of the incoming communication. Thereafter, the incoming communication is forwarded to the selected cellular telephone 17.

If, on the other hand, either the telephone exchange number of the incoming communication does not correspond to a database entry indicating use of the communications interface 10, the seed and response authentication does not match, or the selected cellular telephone 17 is not available or within its cell site of registration, a separate record to this effect is created.

Upon receipt of the incoming communication by the selected cellular telephone 17, an indication is forwarded through the communications interface 10 to the connected telephone handsets 12 such that the incoming communication may be responded to by either the selected cellular telephone 17 or any connected telephone handset 12.

Figure 3A:
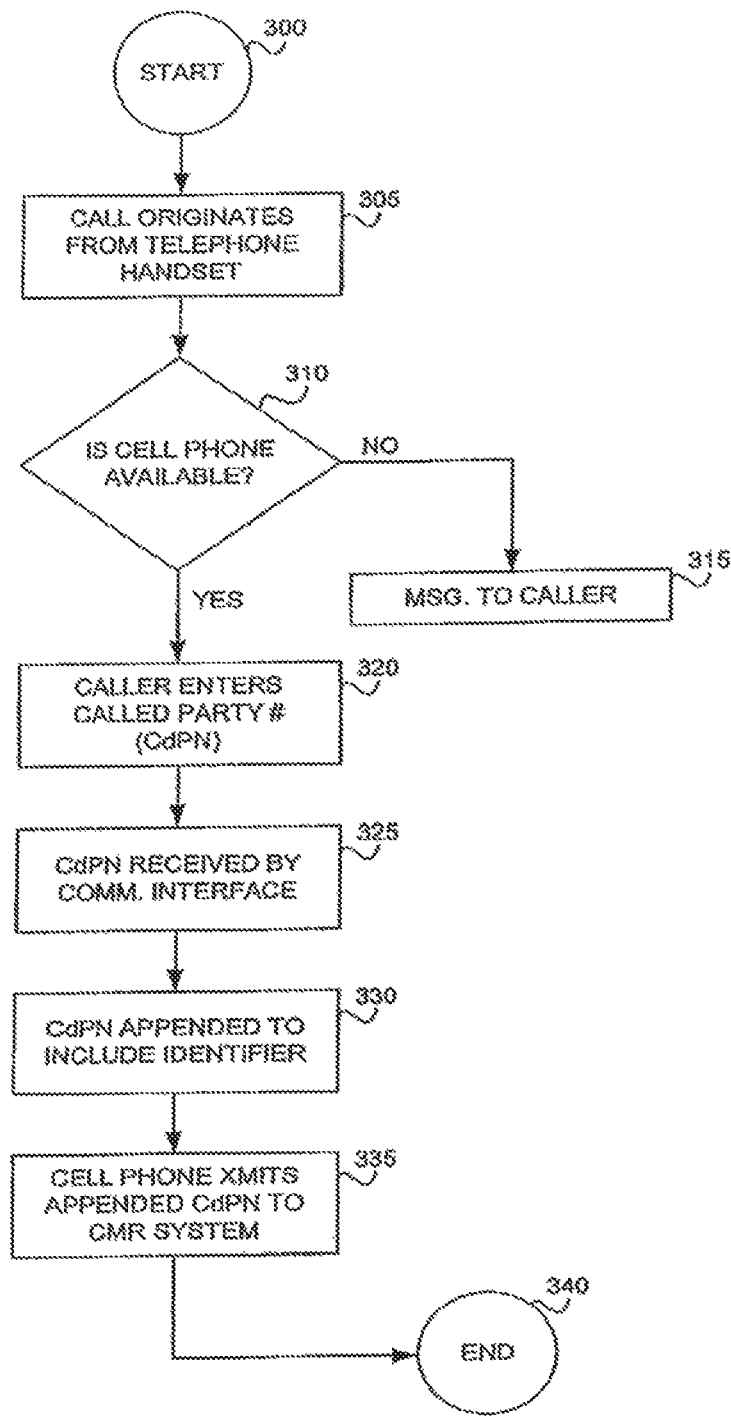
FIGS. 3A and 3B are flow charts illustrating a method of sending an outgoing communication pursuant to an exemplary embodiment of the present invention.

FIG. 3A is a flow chart diagram that shows steps for a method of communicating an outgoing communication through a communications interface 10 through the CMR system 90 and the PSTN 70. Referring to FIG. 3A, the method starts at step 300 and, at step 305, the outgoing communication originates from the telephone handset 12. At step 310, a determination is made as to whether the cellular telephone 17 programmed for operation with the communications interface 10 is communicatively connected to the communications interface 10 and is not already in use. If the cellular telephone 17 is either not communicatively connected to the communications interface 10 or is currently in use, a message to that effect is provided to the individual attempting the outgoing communication (caller), as shown in step 315.

If, on the other hand, the cellular telephone 17 is both communicatively connected to the communications interface 10 and is not already in use, an indication to that effect is similarly provided to the caller. The caller then, responsive to the signal indicating the availability of the cellular telephone 17, enters the telephone exchange number of the individual to whom the outgoing communication is directed (CdPN), as shown in step 320. Step 325 shows the CdPN received by the communications interface, where it is then appended to include the identifier unique to that particular communications interface 10, shown in step 330. Once the CdPN has been appended, the outgoing communication, preceded by the appended CdPN, is transmitted to the CMR system 90 in a manner well known to those skilled in the art.

Figure 3B:
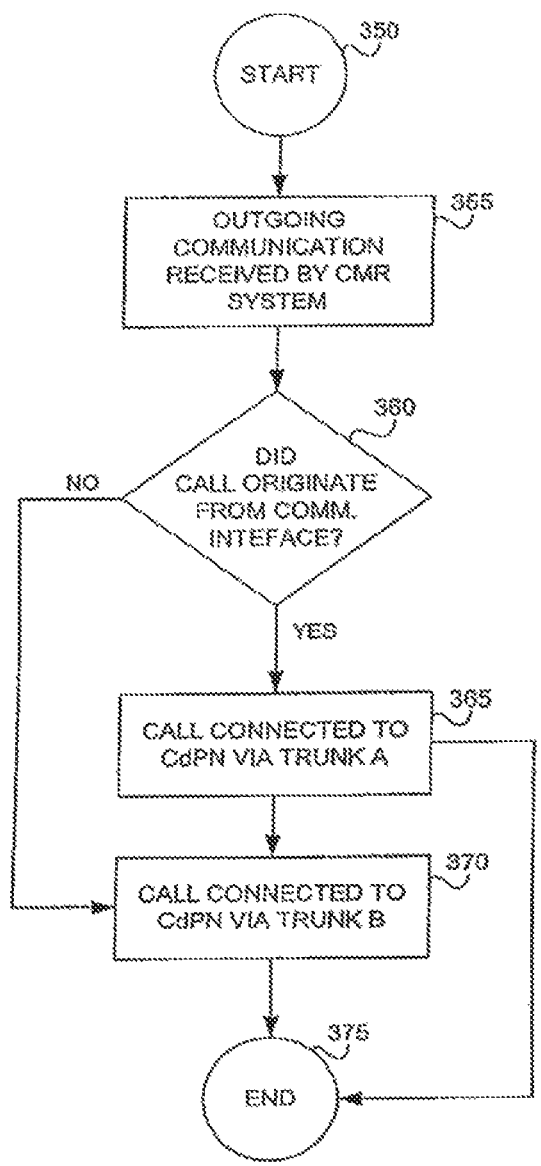

FIG. 3B is a flow chart diagram demonstrating steps for a method of processing a communication, originating with an exemplary embodiment of the present invention, through the CMR system 90. Referring to FIG. 3B, the method starts at step 350 and, at step 355, the outgoing communication (preceded by the appended CdPN) is received by the CMR system 90. The outgoing communication is first received by one of a plurality of individual cell sites 20 connected by communications links 21 to the MSC 30. Upon receipt of the outgoing communication by the MSC 30, the authentication process shown generally at step 360 is performed.

More particularly, the authentication process of step 360 requires the MSC 30 to compare the telephone exchange number from which the outgoing communication originated to telephone exchange numbers of authorized users of the communications interface 10, which numbers are maintained in the database 35 internal to the CMR system 90. If the telephone exchange number from which the outgoing communication originated is verified as an authorized user of a communications interface 10, a seed and response authentication is then performed to further reduce the chance of fraudulent use of the system. Such authentication is performed by the authentication unit 40, which is communicatively connected to the MSC 30. If both authentication steps are completed and indicate that the caller is an authorized user of a communications interface 10, the outgoing communication is relayed to the CdPN via telephone cable trunk 55, as shown in step 365. On the other hand, if authentication is not successfully completed, the outgoing communication is relayed to the CdPN via telephone cable trunk 50, as shown in step 370. The method of connection of an outgoing telephonic communication from the MSC 30 within the CMR system 90 through the PSTN 70 to a particular CdPN 80 is well known to those skilled in the art.

Figure 4:
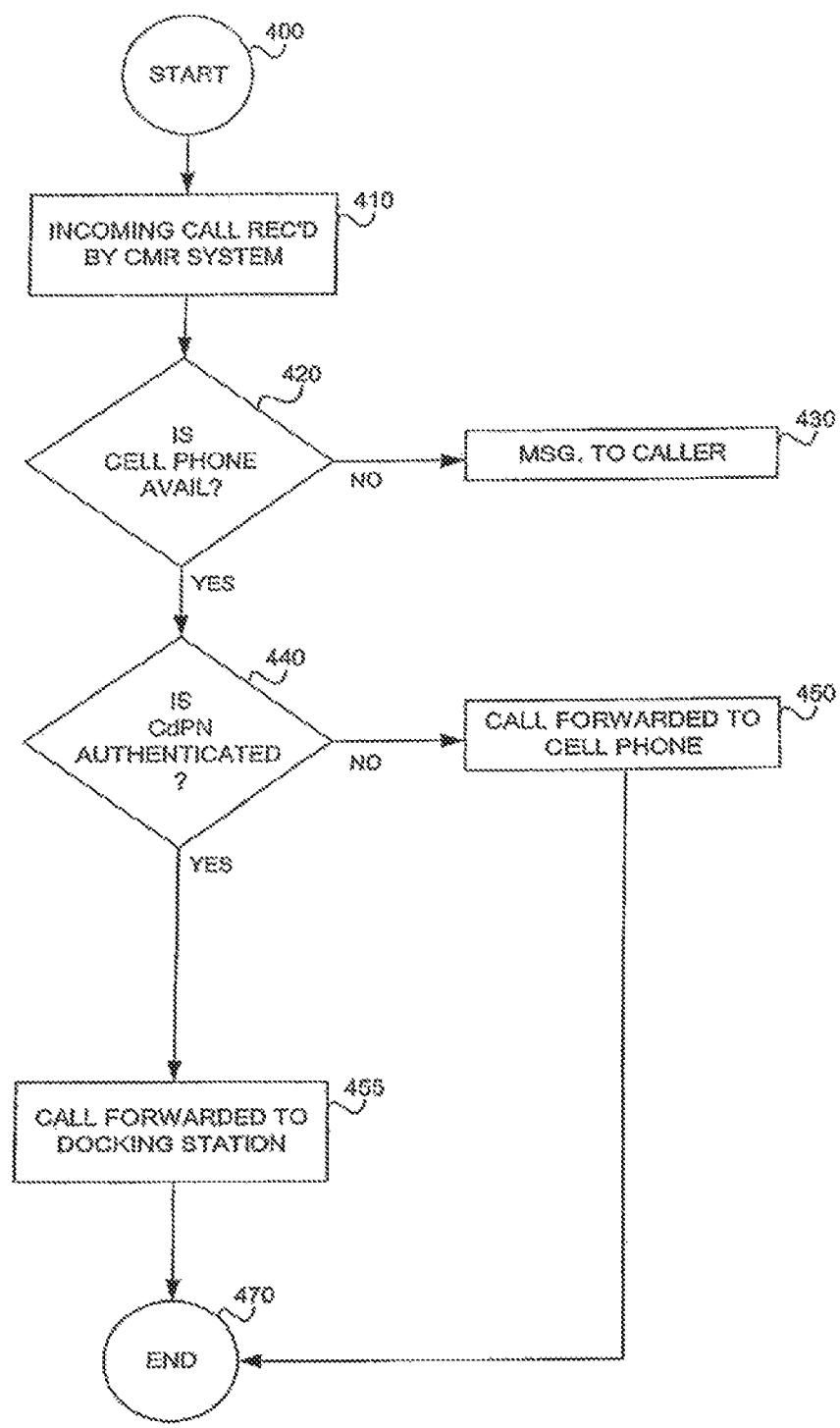
FIG. 4 is a flow chart illustrating a method of receiving an incoming communication by an exemplary embodiment of the present invention.

FIG. 4 is a flow chart diagram that shows steps for a method of processing an incoming communication to a user of a communications interface 10. Referring to FIG. 4, the method starts at step 400 and, at step 410, an incoming communication is received by the CMR system 90. The incoming communication is then forwarded to the MSC 30, where the availability of the cellular telephone 17 to receive an incoming communication is determined by a query transmitted through communications links 21 to cell sites 20 and, thereafter, to the cellular telephone 17. Decision block 420 depicts alternate courses of action depending on the availability of cellular telephone 17. If cellular telephone 17 is not available to receive the incoming communication, a message to that effect is returned to the originator of the call, as shown in step 430.

If, however, the cellular telephone is available to receive the incoming communication, a further inquiry is made to determine whether the intended recipient of the incoming communication is an authorized user of the communications interface 10, shown at step 440. The inquiry consists of two parts. First, the MSC 30 compares the telephone exchange number to which the incoming communication is intended to a list of telephone exchange numbers registered for use with a communications interface, which list is maintained in database 35. If the telephone exchange numbers match, a seed and response authentication procedure, explained above, is performed. Successful completion of both aspects of the authentication process result in forwarding the incoming communication to the cellular telephone in a manner well known to those skilled in the art, as depicted in step 455. Otherwise, an appropriate notation of the failure of the authentication process is made in the database 35 of the CMR system 90 prior to forwarding the incoming communication to the cellular telephone 17.

In summary, the present invention allows individuals who do not have direct access to a PSTN 70 to communicate from, and receive communication at, their homes or another predetermined fixed location telephonically in a convenient and inexpensive manner. This is accomplished by utilizing a communications interface 10 in cooperation with elements found in typical CMR and FWL systems. More particularly, the communications interface 10 provides a communicative link between the conventional telephone handset 12 and the cellular telephone 17 utilizing the TSU 2, CIC 4 and MTIU 6. Importantly, authorized users of the communications interface 10 can be identified as such by the CMR system 90. Once an individual originating an outgoing communication or receiving an incoming communication is identified as an authorized user, the communication to or from that individual can be treated accordingly by the CMR system 90.

While the invention has been described in detail with respect to specific embodiments thereof, it will be appreciated that those skilled in the art, upon attaining an understanding of the foregoing, may readily conceive of alterations to, variations of and equivalents to these embodiments. Accordingly, the scope of the present invention should be assessed as that of the appended claims and any equivalents thereto and not limited to the specific embodiments articulated hereinabove.

Therefore, at least the following is claimed:

1. An apparatus comprising:
    an interface unit for facilitating communication with a cellular telephone; and
    a communications interface controller for
        receiving, from a telephone handset, an outgoing communication,
        determining whether the cellular telephone is in communicative contact with the apparatus, wherein determining whether the cellular telephone is in communicative contact with the apparatus comprises at least one of detecting a signal emanating from the cellular telephone or transmitting a query to the cellular telephone, and
        forwarding the outgoing communication to the interface unit based on a determination that the cellular telephone is in communicative contact with the apparatus, wherein the interface unit is further configured for forwarding the outgoing communication to the cellular telephone for transmission to a cellular mobile radiotelephone system.

2. The apparatus of claim 1, wherein determining whether the cellular telephone is in communicative contact with the apparatus further comprises determining whether the cellular telephone is physically connected to the apparatus.

3. The apparatus of claim 1, wherein the communications interface controller is further configured for:
    receiving a verification sequence from an authentication unit associated with the cellular mobile radiotelephone system, the verification sequence for confirming that the outgoing communication originated from the apparatus;
    performing a predetermined manipulation of the verification sequence; and relaying a result of the predetermined manipulation of the verification sequence back to the authentication unit associated with the cellular mobile radiotelephone system.

4. The apparatus of claim 1, further comprising a telephone support unit for:
receiving the outgoing communication at a first time from the telephone handset and receiving a further outgoing communication at a second time from a further telephone handset, wherein the first time is before the second time;
providing priority to the outgoing communication received at the first time; and
notifying the further telephone handset of an unsuccessful completion of the further outgoing communication.

5. The apparatus of claim 1, wherein the communications interface controller is further for determining whether the cellular telephone is in use.

6. The apparatus of claim 5, wherein forwarding the outgoing communication to the interface unit based on the determination that the cellular telephone is in communicative contact with the apparatus further comprises forwarding the outgoing communication to the interface unit based on the determination that the cellular telephone is in communicative contact with the apparatus and based on a determination that the cellular telephone is not in use.

7. The apparatus of claim 1, wherein the outgoing communication is directed to a telephone number and wherein the communications interface controller is further for appending an identifier to the telephone number, the identifier corresponding to the apparatus.

8. The apparatus of claim 1, wherein the communications interface controller is further for:
receiving, from the cellular telephone, an outgoing communication directed to a telephone number; and
appending an identifier to the telephone number, the identifier corresponding to the apparatus.

9. A method comprising:
receiving, at a communications interface comprising a communications interface controller, an outgoing communication from a telephone handset;
determining, by the communications interface controller, whether a cellular telephone is in communicative contact with the communications interface, wherein determining whether the cellular telephone is in communicative contact with the communications interface comprises at least one of detecting a signal emanating from the cellular telephone or transmitting a query to the cellular telephone;
forwarding, by the communications interface controller, the outgoing communication to an interface unit of the communications interface based on a determination that the cellular telephone is in communicative contact with the communications interface; and
forwarding, by the interface unit, the outgoing communication to the cellular telephone for transmission to a cellular mobile radiotelephone system.

10. The method of claim 9, wherein determining whether the cellular telephone is in communicative contact with the communications interface further comprises determining whether the cellular telephone is physically connected to the communications interface.

11. The method of claim 9, further comprising:
receiving a verification sequence from an authentication unit associated with the cellular mobile radiotelephone system, the verification sequence for confirming that the outgoing communication originated from the communications interface;
performing a predetermined manipulation of the verification sequence; and
relaying a result of the predetermined manipulation of the verification sequence back to the authentication unit associated with the cellular mobile radiotelephone system.

12. The method of claim 9, wherein the outgoing communication is received at a first time and wherein the method further comprises:
receiving a further outgoing communication at a second time from a further telephone handset, wherein the first time is before the second time;
providing priority to the outgoing communication received at the first time; and
notifying the further telephone handset of an unsuccessful completion of the further outgoing communication.

13. The method of claim 9, further comprising determining whether the cellular telephone is in use.

14. The method of claim 13, wherein forwarding the outgoing communication to the interface unit of the communications interface based on the determination that the cellular telephone is in communicative contact with the communications interface further comprises forwarding the outgoing communication to the interface unit of the communications interface based on the determination that the cellular telephone is in communicative contact with the communications interface and based on a determination that the cellular telephone is not in use.

15. The method of claim 9, wherein the outgoing communication is directed to a telephone number and wherein the method further comprises appending an identifier to the telephone number, the identifier corresponding to the communications interface.

16. An apparatus comprising:
an interface unit for facilitating communication with a cellular telephone; and
a communications interface controller for
receiving a verification sequence from an authentication unit associated with a cellular mobile radiotelephone system, the verification sequence for confirming that an outgoing telephone communications request received by the cellular mobile radiotelephone system originated from the apparatus,
performing a predetermined manipulation of the verification sequence, and
relaying a result of the predetermined manipulation of the verification sequence back to the authentication unit associated with the cellular mobile radiotelephone system.

* * * * *